(12) United States Patent
Sanuki et al.

(10) Patent No.: US 9,134,440 B2
(45) Date of Patent: Sep. 15, 2015

(54) RADIATION DETECTOR, RADIATION DETECTION MODULE AND RADIATION DETECTION METHOD

(71) Applicant: KABUSHIKI KAISHA TOSHIBA, Minato-ku (JP)

(72) Inventors: Tomoya Sanuki, Yokohama (JP); Atsushi Nakayama, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 62 days.

(21) Appl. No.: 14/019,046

(22) Filed: Sep. 5, 2013

(65) Prior Publication Data

US 2014/0284488 A1 Sep. 25, 2014

(30) Foreign Application Priority Data

Mar. 21, 2013 (JP) ................. 2013-058939

(51) Int. Cl.
*G01T 1/24* (2006.01)
*G01T 1/29* (2006.01)

(52) U.S. Cl.
CPC ............. *G01T 1/2914* (2013.01); *G01T 1/2928* (2013.01)

(58) Field of Classification Search
CPC .................................................. G01T 1/2914
See application file for complete search history.

(56) References Cited

U.S. PATENT DOCUMENTS 4,675,523 A * 6/1987 Garlick ...................... 250/252.1
4,804,848 A * 2/1989 Horiba et al. ................. 250/394
2003/0042425 A1 * 3/2003 Tashiro et al. ............ 250/370.11
2003/0164455 A1 * 9/2003 Hughes et al. ................ 250/375
2010/0176303 A1 7/2010 Motomura et al.
2012/0112087 A1 * 5/2012 Yokoi ........................... 250/394

FOREIGN PATENT DOCUMENTS

| JP | 63-158490 A | 7/1988 |
| JP | 10-319122 A | 12/1998 |
| JP | 2004-125757 A | 4/2004 |
| JP | 2008-537774 A | 9/2008 |
| JP | 2010-012056 A | 1/2010 |
| WO | 2007/075181 A2 | 7/2007 |

OTHER PUBLICATIONS

Japanese Office Action issued on May 12, 2015 in corresponding Japanese Application No. 2013-058939, along with English translation thereof.

* cited by examiner

*Primary Examiner* — Constantine Hannaher
(74) *Attorney, Agent, or Firm* — White & Case LLP

(57) ABSTRACT

A radiation detector includes a first detection unit including a first radiation entrance region into which incoming radiation enters and in which first photoelectric conversion elements are arranged. The radiation detector also includes a second detection unit including a second radiation entrance region. The first detection unit detects an occurrence position of a first interaction and a track of recoil electron by using the first photoelectric conversion elements. The second detection unit detects an occurrence position of a second interaction resulting from the scattered radiation. A position of a radiation source is measured by the occurrence positions of the first and second interactions and the track of the recoil electron.

20 Claims, 19 Drawing Sheets

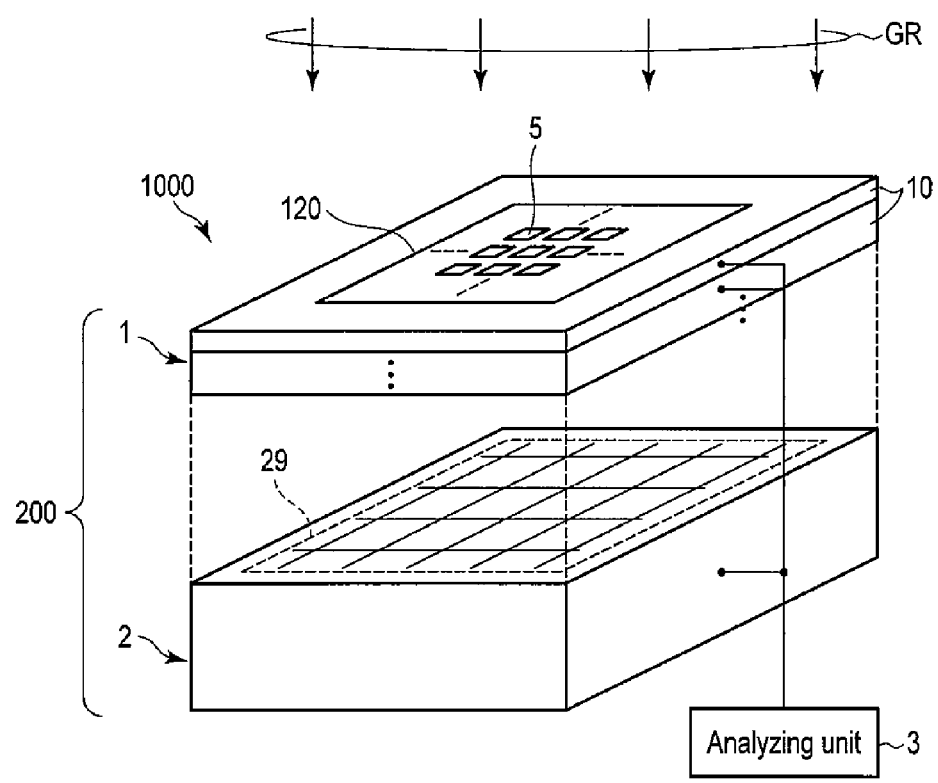
F I G. 1

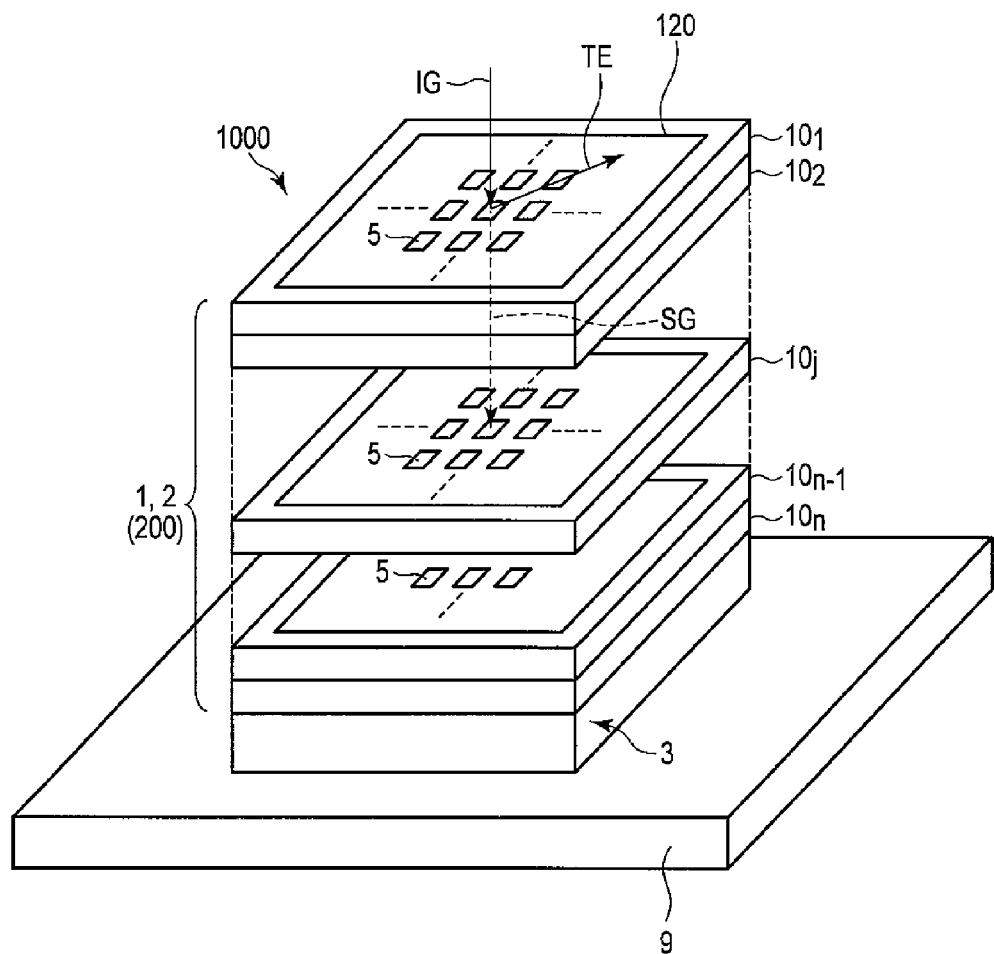
F I G. 2

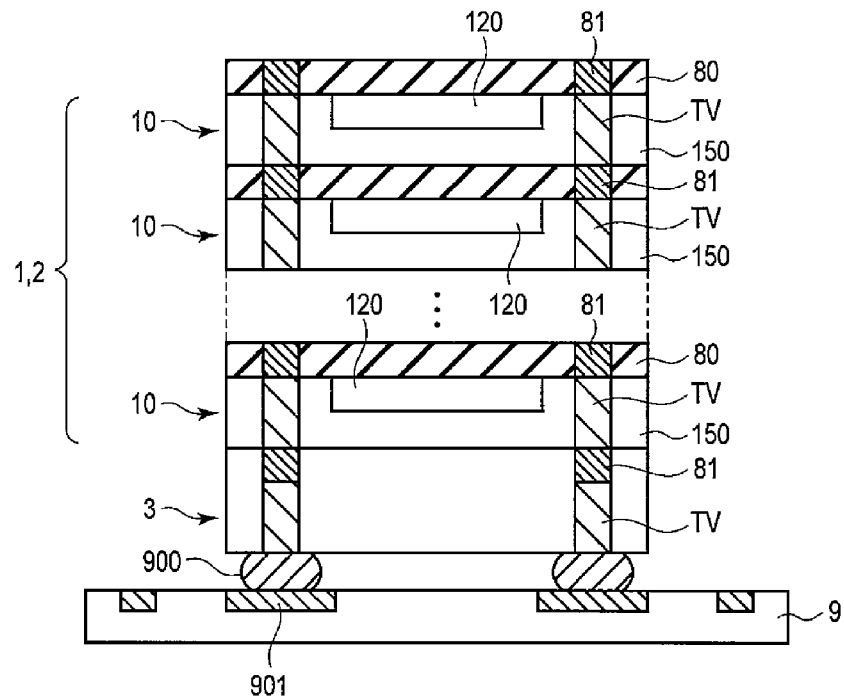
F I G. 3
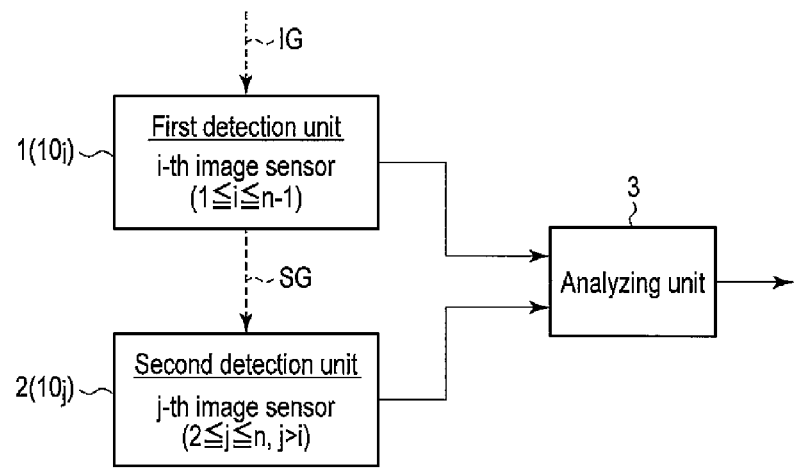
F I G. 4

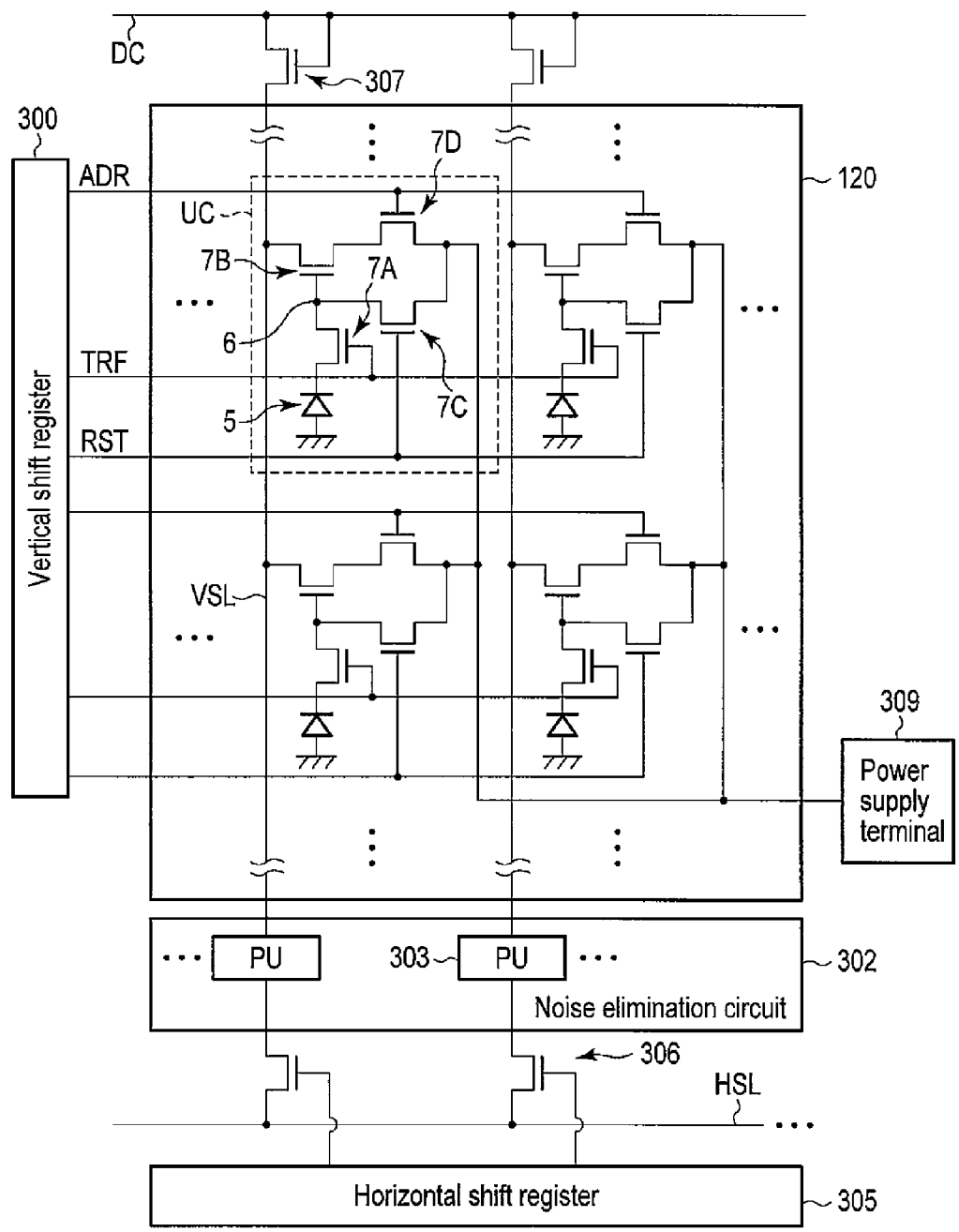
F I G. 5

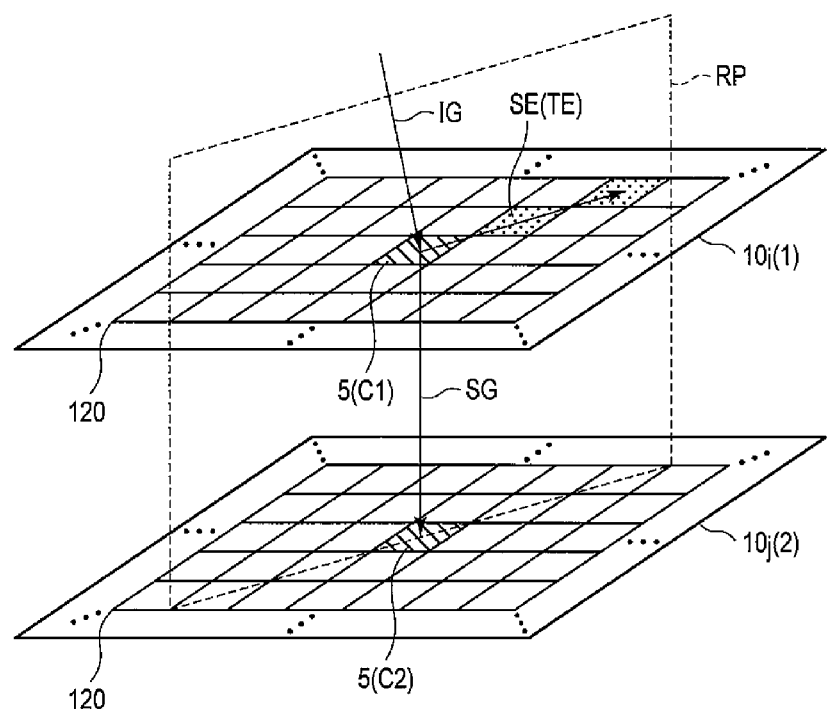
F I G. 6
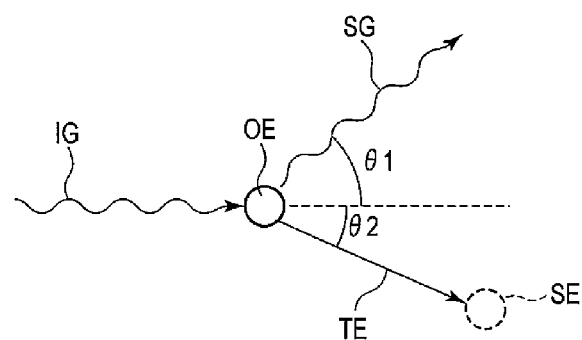
F I G. 7

| Number of incoming photons when there is radiation source of 10 μSv/h | | | |
|---|---|---|---|
| | Light receiving time | | |
| | One minute | Ten minutes | 60 minutes |
| Number of photons | 60,000 | 600,000 | 3,600,000 |

FIG. 12A

| Detection of first scattering event | | | |
|---|---|---|---|
| | Number of detections per light receiving time | | |
| Number of layers | One minute | Ten minutes | 60 minutes |
| 2 | 36 | 364 | 2,186 |
| 10 | 182 | 1,821 | 10,928 |
| 20 | 364 | 3,643 | 21,856 |
| 100 | 1,821 | 18,213 | 109,279 |

FIG. 12B

| Detection of second scattering event | | | |
|---|---|---|---|
| | Number of detections per light receiving time | | |
| Number of layers | One minute | Ten minutes | 60 minutes |
| 2 | 0.000 | 0.000 | 0.000 |
| 10 | 0.25 | 2.5 | 15 |
| 20 | 1.1 | 11 | 63 |
| 100 | 27 | 274 | 1642 |

FIG. 12C

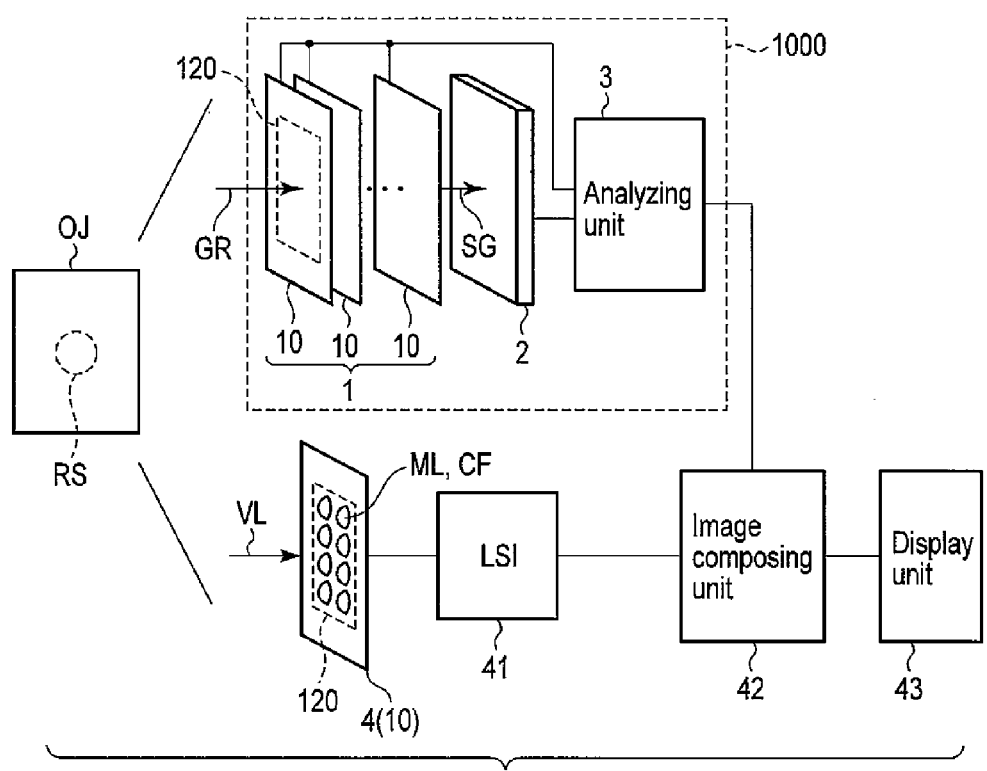
F I G. 19

RADIATION DETECTOR, RADIATION DETECTION MODULE AND RADIATION DETECTION METHOD

CROSS-REFERENCE TO RELATED APPLICATIONS

This application is based upon and claims the benefit of priority from Japanese Patent Application No. 2013-058939, filed Mar. 21, 2013, the entire contents of which are incorporated herein by reference.

FIELD

Embodiments described herein relate generally to a radiation detector, radiation detection module and a radiation detection method.

BACKGROUND

Identifying the position of a radiation source is required in a region that may be contaminated with radioactive substances. However, radiation is invisible to the naked eye, and cannot be directly detected even by the use of a visible-light imaging device.

One method of identifying the position of a radiation source and the traveling direction of radiation includes detecting the energy of scattered gamma rays in a Compton scattering caused by gamma rays from the radiation source and the energy of recoil electrons, and finding the traveling direction of incoming gamma rays from the energies.

Accurate detection of the Compton scattering, the energy of gamma rays, and the energy of recoil electrons tends to increase the size and complexity of a detector.

BRIEF DESCRIPTION OF THE DRAWINGS

FIG. 1 is a bird's-eye view of the basic configuration of a radiation detector;

FIG. 2 is a schematic bird's-eye view showing the structure of a radiation detector according to a first embodiment;

FIG. 3 is a schematic sectional view showing the structure of the radiation detector according to the first embodiment;

FIG. 4 is a schematic block diagram showing the circuit configuration of the radiation detector according to the first embodiment;

FIG. 5 is a diagram showing a configuration example of an image sensor;

FIG. 6 is a diagram illustrating the detection of radiation in the radiation detector according to the embodiment;

FIG. 7 is a diagram illustrating the detection of radiation in the radiation detector according to the embodiment;

FIGS. 12A, 12B and 12C are diagrams illustrating the detection of radiation in the radiation detector according to the embodiment;

FIG. 19 is a schematic diagram showing a structure example of the application of the radiation detector according to the embodiment;

DETAILED DESCRIPTION

Figure 8:
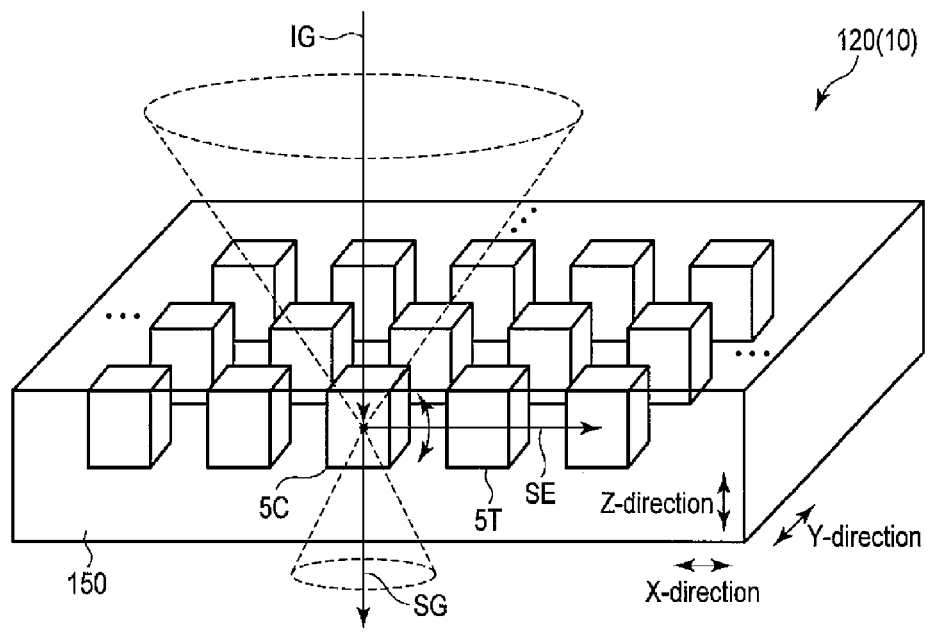
FIG. 8 is a diagram illustrating the detection of radiation in the radiation detector according to the embodiment.

Hereinafter, embodiments will be described in detail with reference to the drawings. Components having the same functions and configurations are provided with the same reference signs in the following explanation, and repeated explanations are given when necessary.

In general, according to one embodiment, a radiation detector includes a first detection unit provided on a substrate, the first detection unit including at least one semiconductor chip having a first radiation entrance region which external incoming radiation enters and in which a plurality of first photoelectric conversion elements are arranged in matrix form, the first detection unit detecting an occurrence position of a first interaction resulting from the incoming radiation in the first radiation entrance region, and a track of recoil electron generated by the first interaction in the first radiation entrance region by using the first photoelectric conversion elements; and a second detection unit which is provided between the substrate and the first detection unit and which includes a second radiation entrance region which is entered scattered radiation resulting from the first interaction, the second detection unit detecting an occurrence position of a second interaction resulting from the scattered radiation in the second radiation entrance region, wherein a position of a radiation source which emits the incoming radiation in a space to be observed is measured by using the occurrence position of the first interaction, the occurrence position of the second interaction, and the track of the recoil electrons.

(A) BASIC CONFIGURATION

The basic configuration of a radiation detector according to the embodiment is described with reference to FIG. 1.

FIG. 1 is a bird's-eye view of the basic configuration of the radiation detector according to the embodiment.

As shown in FIG. 1, a radiation detector 1000 according to the embodiment includes a first detection unit 1 and a second detection unit 2. The first detection unit 1 is stacked on the second detection unit 2. The first and second detection units 1 and 2 constitute a stack structure 200.

The first detection unit 1 functions to detect radiation.

The first detection unit 1 includes a region 120 in which a plurality of photoelectric conversion elements (e.g., photodiodes) 5 are arranged in a matrix. The region in which the plurality of photodiodes are provided in a matrix is hereinafter referred to as a photodiode array 120.

The first detection unit 1 is an image sensor. The photodiode array 120 of the detection unit 1 is formed by a pixel array in which unit cells including the photodiodes 5 and read transistors that constitute pixels (cell circuits) are arranged. The first detection unit 1 includes chips of one or more image sensors 10.

The first detection unit 1 externally detects radiation by storing a charge generated when radiation enters the photodiodes 5 arranged in a matrix.

The second detection unit 2 functions to detect radiation.

The second detection unit 2 may be one or more image sensors, as in the first detection unit 1, or may be a radiation detection device capable of detecting radiation with higher sensitivity than silicon; for example, a CdTe.

For example, the radiation detector 1000 further includes an analyzing unit 3 which subjects signals output from the detection units 1 and 2 to predetermined signal processing.

(B) FIRST EMBODIMENT

A solid-state image sensing device and a manufacturing method of the same according to the first embodiment are described with reference to FIG. 2 to FIG. 14.

(1) Structure

The structure of a radiation detector according to the first embodiment is described with reference to FIG. 2 to FIG. 8.

FIG. 2 is a schematic bird's-eye view showing the radiation detector according to the first embodiment. FIG. 3 is a schematic sectional view showing the sectional structure of the radiation detector according to the first embodiment. FIG. 4 is a schematic block diagram showing the radiation detector according to the first embodiment.

As shown in FIG. 2 to FIG. 4, a radiation detector 1000 according to the first embodiment includes two or more image sensors as first and second detection units 1 and 2. In the present embodiment, both the first and second detection units 1 and 2 are formed by the image sensors.

The radiation detector 1000 has at least one image sensor as the first detection unit 1, and at least one image sensor as the second detection unit 2. In the present embodiment, an analyzing unit 3 is stacked on a support substrate 9, and chips of a plurality of image sensors $10_1, 10_2, \ldots, 10_{n-1}$, and $10_n$ as the first and second detection units 1 and 2 are stacked on the analyzing unit 3. The image sensors $10_1$ to $10_n$ are simply referred to as image sensors 10 when not distinguished from one another.

Photodiodes 5 trap and store a charge generated by Compton scattering of incoming radiation, and read a signal corresponding to the charge, thereby detecting the generation of the scattering (interaction) of the radiation and the incoming of the radiation. The amount of charge generated by the scattering (here, Compton scattering) of radiation is close to the number of saturation electrons of the photodiodes 5. Thus, the photodiodes 5 which have detected visible light and the photodiodes 5 which have detected radiation can be distinguished from each other by the signals output by the photodiodes 5. Radiation has high permeability. Therefore, a shield (e.g., a filter or a metallic film) that covers the image sensors 10 may be provided to prevent the visible light from entering the image sensors as the first and second detection units 1 and 2.

The analyzing unit 3 is a semiconductor chip including an image processing circuit, and is an LSI. As shown in FIG. 2 and FIG. 3, the chip of the analyzing unit 3 is provided on the same support substrate 9 as the chips of the image sensors. For example, a stack structure 200 of the first and second detection units 1 and 2 is stacked on the analyzing unit 3. This reduces the area of the radiation detector 1000 on the support substrate 9. The location of the analyzing unit 3 is not limited to the present embodiment. For example, the analyzing unit 3 may be on the same support substrate 9, and the first and second detection units 1 and 2 do not need to be stacked on the analyzing unit 3. Moreover, the analyzing unit 3 does not need to be disposed on the support substrate 9.

The analyzing unit 3 processes the signals output from the image sensors 10 as the first and second detection units 1 and 2. As shown in FIG. 4, the signals output from the image sensors 10 as the first and second detection units 1 and 2 are sent to the analyzing unit 3. The analyzing unit 3 receives the signals output from the image sensors 10, and processes the signals to predict/identify the traveling direction of radiation and the position of a radiation source. The processing result is output to the outside from the analyzing unit 3.

For example, the analyzing unit 3 can determine which of detected Compton scatterings is a series of multiple Compton scattering by the analysis of the output signal of the photodiode array 120 of each image sensor 10 (by e.g., the superimposition of row/column information in each photodiode array 120 on the detection result of the Compton scattering). The analyzing unit 3 can also determine the relation between the first detection unit 1 and the second detection unit 2 from the image sensors 10 by the signal output from the photodiode array 120 of each image sensor 10.

The analyzing unit 3 may function as a control unit which controls the operations of the image sensors 10 as the first and second detection units 1 and 2.

The image sensors 10 include unit cells provided with the photodiodes 5 and read circuits such as read transistors and peripheral circuits such as logic circuits or analog circuits which control the unit cells on a semiconductor substrate made of, for example, silicon. An example of the image sensor is described below with reference to FIG. 5.

As shown in FIG. 5, the configuration in which one unit cell UC includes one photodiode 5 as a pixel is called a one-pixel one-cell structure.

Elements 5, 7A, 7B, 70, and 7D in the unit cell UC are connected as below.

The anode of the photodiode 5 is, for example, grounded, or connected to a constant voltage line having a predetermined voltage. The cathode of the photodiode 5 is connected to a floating diffusion 6 via the current path of the read transistor 7A.

The read transistor 7A controls the storage and transfer of the charge of the photodiode 5.

The gate of the read transistor 7A is connected to a read control line TRF. One end of the current path of the read transistor 7A is connected to the cathode of the photodiode 5. The other end of the current path of the read transistor 7A is connected to the floating diffusion 6.

The amplifier transistor 7B detects and amplifies the signal (potential) of the floating diffusion 6. The signal amplified by the amplifier transistor 7B is output to a vertical signal line VSL. The amplifier transistor 7B functions as a source follower.

The gate of the amplifier transistor 7B is connected to the floating diffusion 6. One end of the current path of the amplifier transistor 7B is connected to the vertical signal line VSL. The other end of the current path of the amplifier transistor 7B is connected to one end of the current path of the address transistor 7D.

The reset transistor 7C resets the potential of the floating diffusion 6.

The gate of the reset transistor 7C is connected to a reset control line RST. One end of the current path of the reset transistor 7C is connected to the floating diffusion 6. The other end of the current path of the reset transistor 7C is connected to a power supply terminal 309.

The address transistor 7D controls the activation of the unit cell UC.

The gate of the address transistor 7D is connected to an address control line ADR. One end of the current path of the address transistor 7D is connected to the other end of the current path of the amplifier transistor 7B. The other end of the current path of the address transistor 7D is connected to the power supply terminal 309.

The power supply terminal 309 is connected to a drain power supply, or to a ground power supply, or to a unit cell (reference potential cell) in an optical black region.

A vertical shift register 300 is connected to the read control line TRF, the address control line ADR, and the reset control line RST. The vertical shift register 300 controls the potentials of the read control line TRF, the address control line ADR, and the reset control line RST, and controls and selects the unit cells UC in the photodiode array (pixel array) 120 by the row. The vertical shift register 300 outputs, to the control lines TRF, ADR, and RST, control signals for controlling the on and off of the transistors 7A, 7C, and 7D.

A noise elimination circuit 302 is connected to the vertical signal line VSL. The noise elimination circuit 302 includes a processing unit 303, for example, to convert an analog signal from the photodiode (unit cell UC) to a digital signal, and to perform correlated double sampling (CDS) processing. As a result, noise of the signal detected by the photodiode is eliminated.

A horizontal shift register 305 is connected to the gate of a horizontal select transistor 306. The horizontal shift register 305 supplies a horizontal selection pulse to the gate of the horizontal select transistor 306 at a predetermined operation timing, and controls the column of the photodiode array 120.

One end of the current path of the horizontal select transistor 306 is connected to a horizontal control line HSL. The other end of the current path of the horizontal select transistor 306 is connected to one end of the vertical signal line VSL via the processing unit 303. The horizontal select transistor 306 is activated or deactivated by the horizontal selection pulse from the horizontal shift register 305.

A load transistor 307 is used as a current source for the vertical signal line VSL. The gate of the load transistor 307 is connected to a control line DC. One end of the current path of the load transistor 307 is connected to one end of the current path of the amplifier transistor 7B via the vertical signal line VSL. The other end of the current path of the load transistor 307 is connected to the control line DC.

An example of the signal (charge) output operation of the photodiode is described. For example, the image sensors 10 as the detection units 1 and 2 can be driven by substantially the same operation as the image sensor for forming a visible-light image.

A predetermined row of the photodiode array 120 is selected by the vertical shift register 300.

The address transistor 7D belonging to the selected row is switched on by the control of the vertical shift register 300. The reset transistor 7C is switched on by the control of the vertical shift register 300. The floating diffusion 6 is connected to the power supply terminal 309 via the reset transistor 7C that is on. As a result, the floating diffusion 6 is reset.

The potential of the vertical signal line VSL is changed to a voltage (reset voltage) corresponding to the potential of the reset floating diffusion 6 by the amplifier transistor 7B that forms the source follower. The reset voltage is input to the noise elimination circuit 302.

After the reset voltage is sampled by the noise elimination circuit 302, the reset transistor 7C is switched off.

The read transistor 7A is switched on by the control of the vertical shift register 300, and the charge (signal charge) stored in the photodiode 5 is transferred to the floating diffusion 6. The potential of the floating diffusion 6 is modulated in accordance with the number of signal charges transferred from the photodiode 5.

The potential of the vertical signal line VSL is changed to an intensity corresponding to the modulated potential (signal voltage) of the floating diffusion by the amplifier transistor 7B that forms the source follower.

The signal voltage output to the vertical signal line VSL is sampled by the noise elimination circuit 302.

The reset voltage and the signal voltage from the unit cells UC belonging to the same row are sequentially converted from analog values to digital values by the noise elimination circuit 302, or subjected to CDS processing. A difference value between the reset voltage and the signal voltage from the unit cells UC is output to the analyzing unit 3 as a cell signal by the control of the horizontal shift register 305 and the horizontal select transistor 306.

Consequently, the operation of outputting signals from a plurality of photodiodes belonging to a predetermined row is completed. This signal output operation in the photodiode array 120 is sequentially repeated, so that the signals detected by the image sensors 10 are sent to and acquired by the analyzing unit 3.

The image sensors 10 used as the first and second detection units 1 and 2 may be formed by the use of a unit cell which includes two or more pixels (photodiodes), as in a two-pixel one-cell structure, a four-pixel one-cell structure, or an eight-pixel one-cell structure. The operation of the image sensors 10 is not limited to the operation described above, and may be properly changed depending on a radiation detection sequence (operation cycle).

The image sensor 10 shown in FIG. 5 is illustrative only and is not limited. For example, the image sensor 10 used in the present embodiment is applicable to the radiation detector 1000 without the noise elimination circuit 302 shown in FIG. 5. This is because the amount of charge generated by the incoming radiation is relatively great, thus the image sensor is much less affected by noise than in the detection of visible light. The circuit area can be reduced by the elimination of unnecessary circuits such as the noise elimination circuit 302.

The image sensors 10 as the first and second detection units 1 and 2 do not need to have color filters and microlens arrays. However, it should be noted that the image sensors 10 may have the color filters and the microlens arrays. The image sensors 10 used as the first and second detection units may be either front side illumination type CMOS image sensors or back side illumination type CMOS image sensors. For example, in the front side illumination type CMOS image sensor, the thickness of a semiconductor substrate 150 shown in FIG. 3 is 100 µm or less (e.g., about 60 µm), and the thickness of a multilayer interconnect structure on the semiconductor substrate 150 is several μm.

CCD image sensors may be used as the first and second detection units 1 and 2 instead of the CMOS image sensors. The image sensors 10 used as the first and second detection units 1 and 2 may be a mixture of the CMOS and CCD image sensors.

As shown in FIG. 3, the stacked image sensors 10 are electrically connected to one another by a through-via TV in the semiconductor substrate 150 and by a multilayer interconnect 81 in an interlayer insulating film 80.

When the image sensors 10 are stacked on the analyzing unit 3, the image sensors 10 and the analyzing unit 3 may be electrically connected to each other by the through electrode TV/the multilayer interconnect 81 provided in the chip of the analyzing unit 3.

The image sensors 10 and the analyzing unit 3 may be connected to a interconnect 901 provided in the support substrate 9 via a connection terminal 900.

Bonding wires may be used to connect the stacked image sensors 10 and to connect the image sensors 10 and the analyzing unit 3 or connect the analyzing unit 3 and the support substrate 9.

In FIG. 2 to FIG. 5, the radiation detector 1000 according to the present embodiment has CMOS image sensors used as the first and second detection units 1 and 2 to detect radiation.

As described above, the radiation detector 1000 according to the present embodiment uses the image sensors 10 as the first and second detection units 1 and 2 to detect a charge generated by the multiple Compton scattering resulting from gamma rays.

In order to improve the frequency of the detection of the Compton scattering by the first and second detection units 1 and 2, it is preferable to stack the chips of three or more image sensors 10 to form the first and second detection units 1 and 2.

For example, the image sensor in which a first Compton scattering is detected among the chips of the image sensors 10$_1$ to 10$_n$ stacked on the support substrate 9 is used as the first detection unit 1. The image sensor in which a second Compton scattering resulting from scattered gamma rays generated by the first Compton scattering is detected among the chips of the image sensors under the image sensor in the which the first Compton scattering has occurred is used as the second detection unit 2.

Thus, in the present embodiment, the first and second detection units 1 and 2 are formed by the stack structure 200 including two or more image sensors.

FIG. 6 is a schematic diagram illustrating the detection of radiation (Compton scattering) in the radiation detector according to the present embodiment.

In the photodiodes 5 in the stacked image sensors 10, high-energy recoil electrons result from the Compton scattering, and a charge is generated by these recoil electrons when their energy is dissipated upon collision with silicon. The generated charges are trapped and stored by the photodiodes 5, so that occurrence positions C1 and C2 of the Compton scattering in the photodiode array (pixel array) 120, and a movement direction (track) TE of recoil electrons SE are detected. Incoming gamma rays IG are schematically shown in FIG. 6. However, the traveling direction (incoming direction) of the invisible gamma rays IG is not known at the time of the detection of the first Compton scattering and until the completion of the radiation detection sequence by the apparatus.

In the image sensor 10$_i$ as the first detection unit 1, the first Compton scattering resulting from the gamma rays (incoming gamma rays) IG entering from the outside of the apparatus is detected by the photodiodes 5 in the photodiode array 120.

The recoil electrons SE resulting from the first Compton scattering are also generated in the image sensor 10$_i$. The track TE of recoil electrons SE is detected by the photodiodes 5 in the photodiode array 120. The space (pitch) between the photodiodes 5 in the photodiode array 120 is, for example, about 1 μm to 2 μm. The photodiodes 5 thus adjoin one another with a relatively small space, so that the radiation detector 1000 according to the present embodiment can detect the track TE of recoil electrons SE of about 1 μm to several ten μm.

As a result of the first Compton scattering, the incoming gamma rays IG are scattered, and scattered gamma rays SG are generated.

In the image sensor 10$_j$ as the second detection unit 2 positioned lower than the image sensor 10$_i$ (on the side of the support substrate 9), a second Compton scattering resulting from the scattered gamma rays SG is detected by the photodiode 5.

The angle (scattering angle of the scattered gamma rays) between the incoming direction of the incoming gamma rays IG and the scattering direction of the scattered gamma rays SG depends on the energy of the incoming gamma rays IG. Therefore, the scattering direction of the scattered gamma rays SG, i.e., the region where the second Compton scattering occurs can be narrowed if the energy of the incoming gamma rays IG is assumed to be within a given range. This improves the accuracy of the detection of the second Compton scattering.

In the present embodiment, the occurrence positions C1 and C2 of the first and second Compton scatterings and the track TE of recoil electrons SE are acquired as positional information (coordinates) indicated by the row and column of the photodiode array 120 in accordance with the output results of the image sensors 10$_i$ and 10$_j$.

The analyzing unit 3 performs calculation processing based on three pieces of positional information: the occurrence positions C1 and C2 of the first and second Compton scatterings in the photodiode array 120 of the first and second detection units 1 and 2, and the track (i.e., the origin/end of the movement direction) of the recoil electrons SE in the photodiode array 120. The analyzing unit 3 calculates a plane RP including three coordinates (points) acquired by the detection of the multiple Compton scattering. The calculated plane (hereinafter referred to as a calculation plane) RP includes a straight line corresponding to the traveling direction of the gamma rays (the incoming direction of the gamma rays IG). For example, a radiation source exists on the extension of the calculation plane RP.

In accordance with the obtained calculation plane RP, the radiation detector 1000 according to the present embodiment can determine the traveling direction of the gamma rays and the position of the radiation source from the direction of the incoming gamma rays IG.

As described above, the radiation detector 1000 according to the present embodiment can predict/identify the traveling direction of radiation and the position of the radiation source by the analysis using three pieces of positional information detected by the image sensors without using a detector to directly measure the intensity of the energy of the gamma rays.

Thus, the radiation detector 1000 according to the present embodiment does not need to include any configuration/function to accurately measure the intensity of the energy of the gamma rays, and can therefore be reduced in size.

The thickness of the chip of one image sensor is about 60 μm to 100 μm. Therefore, according to the present embodiment, a radiation detector having a relatively small size can be provided even if a plurality of image sensors 10 are stacked to form the first and second detection units 1 and 2.

The chip (silicon chip) of the image sensor 10 for detecting radiation costs less than the material (e.g., CdTe) used in a known radiation detector. Thus, according to the present embodiment, a low-cost radiation detector can be provided.

Consequently, according to the present embodiment, the radiation detector can be reduced in size, and its manufacturing costs can be reduced.

(2) Multiple Compton Scattering and Detection of Recoil Electrons

The detection of a Compton scattering by the radiation detector according to the present embodiment and the analysis of the traveling direction of radiation (the position of the radiation source) based on the detected Compton scattering are described with reference to FIG. 7 to FIG. 11. FIG. 2 to FIG. 6 are also used as necessary to describe the detection of a Compton scattering in the radiation detector according to the present embodiment and the analysis of the traveling direction of radiation (the position of the radiation source).

FIG. 7 is a schematic diagram illustrating the Compton scattering.

When gamma rays having relatively high energy (e.g., about 100 keV to 1 MeV) have entered a given material (here, a silicon layer), Compton scattering occurs with a certain probability.

As shown in FIG. 7, in the Compton scattering, the incoming gamma rays IG collide with electrons (orbital electrons) OE on the electron orbit of the silicon atom that forms the photodiode. As a result of the collision of the incoming gamma rays IG with the orbital electrons OE, the gamma rays IG are scattered, and the high-energy recoil electrons SE and the scattered gamma rays SG are generated.

The scattered gamma rays SG are scattered at an angle $\theta 1$ corresponding to the intensity of the energy of the gamma rays IG. The recoil electrons SE are also driven out of the electron orbit of the atom at an angle $\theta 2$ corresponding to the intensity of the energy of the incoming gamma rays IG. The law of conservation of energy is satisfied between the incoming gamma rays IG, the scattered gamma rays SG, and the recoil electrons SE. Therefore, the energy of the scattered gamma rays SG is equal to the energy of the incoming gamma rays IG minus the energy of the recoil electrons SE.

When the energy of the incoming gamma rays IG is higher, the scattering cross section of the gamma rays tend to be scattered forward.

For example, when the intensity of the energy of the incoming gamma rays IG ranges from 500 keV to 1 MeV, the scattered gamma rays SG are scattered forward with a probability of 70% or more, and of the gamma rays scattered in front of the former gamma rays, the angle $\theta 1$ between the direction of the incoming gamma rays IG and the direction of the scattered gamma rays SG ranges from −30° to +30° with reference to (around) the direction of the incoming gamma rays IG with a certain high degree of probability.

For example, when the radiation source is assumed to be cesium, gamma rays generated from radioactive cesium (e.g. $^{134}$Cs, $^{137}$Cs) have an energy of 500 keV or more.

For example, the energy emitted from $^{137}$Cs is 622 keV. In this case, the angle ($\theta 1 + \theta 2$) between the scattering direction of the scattered gamma rays SG and the recoil direction of the recoil electrons SE is substantially 90°.

When the energy of the gamma rays ranges from 500 keV to 1 MeV, there is a high probability that the scattering angle $\theta 1$ of the scattered gamma rays (scattered photons) SG with reference to the incoming direction of the incoming gamma rays is about 0° to 30° as described above, and the scattering angle $\theta 2$ of the recoil electrons SE with reference to the incoming direction of the incoming gamma rays IG is about 60° to 90°. In this case, the energy of the recoil electrons SE immediately after recoiling is about 0 to 100 keV.

<Detection of Compton Scattering and Recoil Electrons>

The detection of a Compton scattering by the radiation detector according to the present embodiment and the detection of the orbit of recoil electrons are described with reference to FIG. 8 to FIG. 11.

Figure 9:
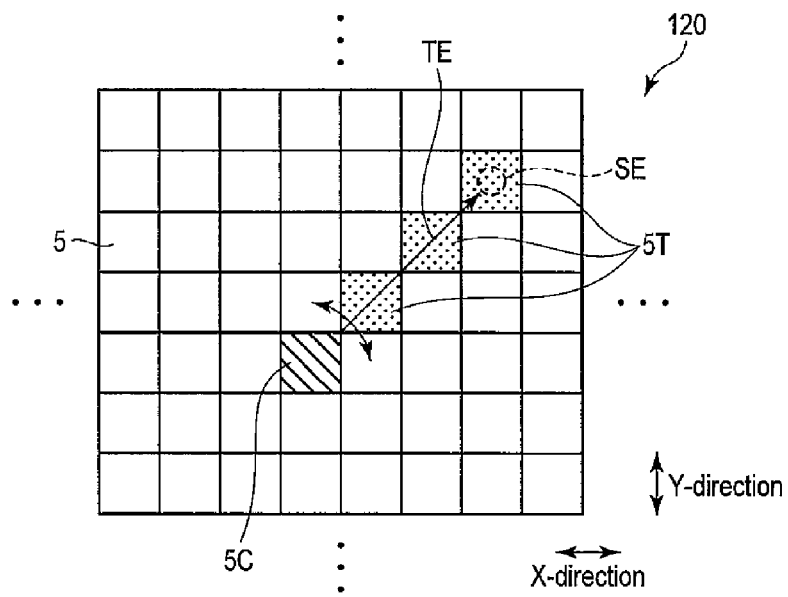
FIG. 9 is a diagram illustrating the detection of radiation in the radiation detector according to the embodiment.

FIG. 8 is a schematic diagram of the image sensor illustrating the detection of the direction of the incoming gamma rays, the scattered gamma rays, and the scattering direction of the recoil electrons in a certain image sensor. FIG. 9 is a schematic plane view of the image sensor illustrating the detection of the scattering direction of the recoil electrons in a certain image sensor. FIG. 10 is a schematic sectional view of the image sensor illustrating the detection of the direction of the incoming gamma rays to a certain image sensor, the scattered gamma rays, and the scattering direction of the recoil electrons.

As shown in FIG. 8 to FIG. 10, the photodiodes 5 (unit cells) are arrayed. In FIG. 8 to FIG. 10, transistors and element isolation insulating films in the unit cells are not shown for simplicity.

The invisible gamma rays (photons) IG from the radiation source existing in a certain space enter the photodiode array (pixel array) 120 of the image sensor 10 in a certain direction and at a certain angle of incidence.

The incoming gamma rays IG cause a Compton scattering with a certain probability. The photodiode 5C existing at the position where the Compton scattering has occurred traps and stores a charge generated by the recoil electrons in the Compton scattering.

A signal of the photodiode 5C which has stored the charge is output, so that the position of the Compton scattering which has occurred in the photodiode array 120 can be detected. As a result, the occurrence position of the Compton scattering can be acquired as coordinate information corresponding to the row and column of the photodiode array 120.

The recoil electrons SE and the scattered gamma rays SG are generated by the Compton scattering resulting from the incoming gamma rays IG. When the energy of the incoming gamma rays IG ranges from 500 keV to 1 MeV as described above, the scattering angle $\theta 1$ of the scattered gamma rays (scattered photons) SG ranges from about 0° to 30° with a certain degree of high probability. In this case, the scattering angle (recoil angle) $\theta 2$ of the recoil electrons SE formed by the incoming direction of the gamma rays and the scattering direction (recoil direction) of the recoil electrons SE ranges from about 60° to 90°. Therefore, the recoil electrons SE are likely to move to the other photodiode 5 adjacent to the photodiode 5C in which the Compton scattering has occurred.

In the examples shown in FIG. 8 and FIG. 9, the recoil electrons SE randomly move to any of the photodiodes adjacent to the photodiode 5C in which the Compton scattering has occurred, in a direction parallel to the main surface of the semiconductor substrate 150.

The generated recoil electrons SE move across the photodiodes 5 in accordance with the energy of the recoil electrons SE. The recoil electrons SE collide with the atoms (electrons) in the semiconductor substrate 150, and move between the photodiodes 5 while generating electron-hole pairs corresponding to the intensity of the energy of the recoil electrons SE as a result of ionization. The energy of the recoil electrons SE dissipates and then the electrons disappear. When the recoil electrons SE have an energy ranging from several keV to several hundred keV, the track TE of the recoil electrons SE is about several μm to several ten μm.

A charge corresponding to the generated electron-hole pairs is trapped and stored in the photodiode 5T through which the recoil electrons SE have passed. As a result, the charge generated by the recoil electrons SE is stored not only in the photodiode 5C in which the Compton scattering has occurred but also in the photodiode 5T through which the recoil electrons SE have passed.

The track TE of the recoil electrons SE in the photodiode array 120 can be detected by the output of the signal of the photodiode which has stored the charge. As a result, the track TE of the recoil electrons SE can be acquired as coordinate information corresponding to the row and column of the photodiode array 120.

Here, the detection of the recoil electrons SE generated by the Compton scattering is described with reference to FIG. 10.

As shown in FIG. 10, the gamma rays IG having a certain angle of incidence enter the image sensor 10 from a light receiving surface for gamma rays in the image sensor 10 in the depth direction of the image sensor 10. Thus, the recoil electrons SE generated by the Compton scattering may move with a certain angle to the depth direction of the semiconductor substrate 150. That is, the track TE of the recoil electrons SE not only has a vector component in a direction parallel to the main surface of the semiconductor substrate 150 but also has a vector component in a direction perpendicular to the main surface of the semiconductor substrate 150.

For example, when image sensor chips for a digital still camera (e.g., DSLR) are used as the first and second detection units 1 and 2, the number of photodiodes (number of pixels) in the photodiode array (pixel array) 120 is ten million (10 M pixels) or more. In the CMOS image sensor, the photodiodes (pixels/unit cells) two-dimensionally arranged to detect the Compton scattering adjoin with a pitch of, for example, 1 μm to 2 μm. Impurity semiconductor layers (diffusion layers) of the photodiodes 5 and 5C have a depth (a dimension in a direction perpendicular to the main surface of the silicon substrate) of, for example, 3 μm to 4 μm.

For example, a general image sensor is formed to have a view angle (field angle) of about 60° to visible light. As described later, when the traveling direction of radiation and the position of the radiation source calculated by the radiation detector according to the present embodiment are superimposed and displayed on an image of the space (or subject) to be observed, the recoil electrons are preferably detected in consideration of the range of the angle of incidence of the gamma rays corresponding to the view angle to visible light.

Figure 10A:
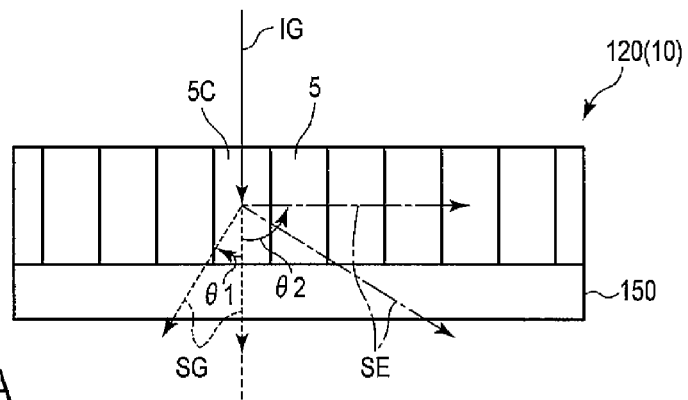
FIGS. 10A, 10B and 10C are diagrams illustrating the detection of radiation in the radiation detector according to the embodiment.
Figure 10B:
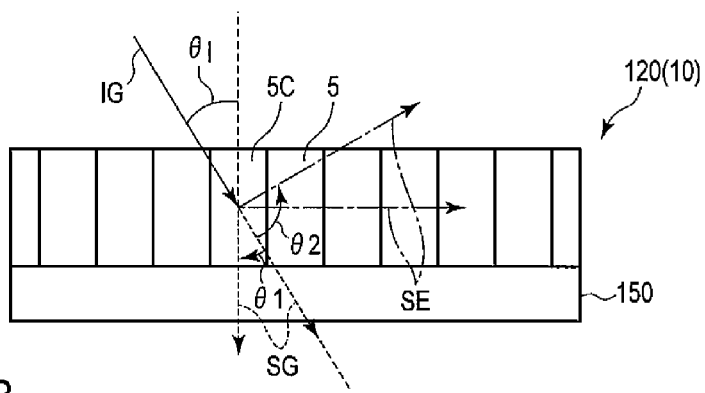
Figure 10C:
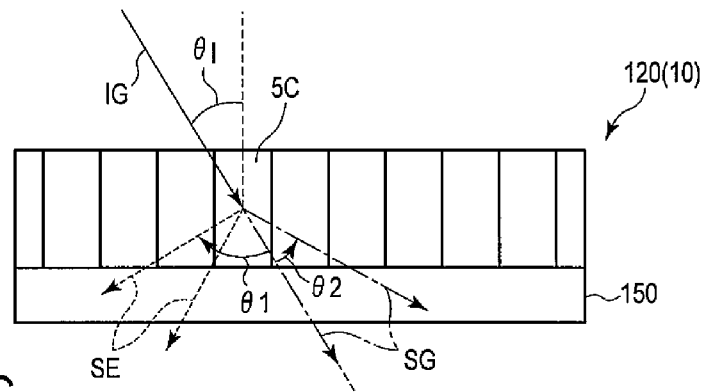

When the view angle of the image sensor to visible light is 60°, the angle of incidence θ1 of the gamma rays IG formed by a normal line in the surface (the light receiving surface of the image sensor) of the semiconductor substrate 150 and the incoming direction of the gamma rays ranges from +30° to −30°. In FIGS. 10A to 10C, the energy of the gamma rays IG entering the image sensor 120 is assumed to be about 500 keV to 1 MeV. As described above, of the gamma rays having this energy, the recoil angle θ2 of the recoil electrons SE with reference to the direction of the incoming gamma rays IG ranges from about 60° to 90° with a certain degree of high probability.

For example, in the case shown in FIG. 10A, the gamma rays IG have entered the semiconductor substrate 150 from the normal direction (angle θI=0°) of the semiconductor substrate 150. With reference to a direction parallel (0°) to the surface of the semiconductor substrate 150, the recoil electrons SE move toward the rear surface (lower layer on the side of the image sensor) of the semiconductor substrate 150 at an angle of 0° to 30°.

As described above, the recoil electrons SE move a distance of several μm to several ten μm in the photodiode array 120. The pitch of the photodiodes 5 and 5C in the photodiode array 120 is 1 μm to 2 μm. Therefore, in the case shown in FIG. 10A, even if the recoil direction of the recoil electrons SE includes a component that moves in a direction perpendicular to the surface of the semiconductor substrate 150, the recoil electrons SE are likely to move across a plurality of photodiodes when the distance between the photodiodes and the depth of the photodiodes are taken into consideration.

In the cases shown in FIGS. 10B and 10C, the gamma rays IG have entered at an angle θ1 of 30° with respect to a normal line to the main surface of the semiconductor substrate 150.

In the case shown in FIG. 10B, the recoil electrons SE recoil in the same direction as the incoming gamma rays IG, and are scattered forward. When the recoil angle θ2 of the recoil electrons SE ranges from 60° to 90°, the angle of the recoil direction of the recoil electrons SE to the normal line to the surface of the semiconductor substrate 150 is 90° to 120°. In other words, the recoil electrons SE move toward the adjacent photodiode 5 at an angle (elevation angle) of 0° to 30° with reference to a direction parallel to the surface of the semiconductor substrate 150.

In the case shown in FIG. 10C, the recoil electrons SE recoil in a direction opposite to the incoming gamma rays IG, and are scattered backward. The recoil electrons SE move toward the adjacent photodiode 5 at an angle (depression angle) of 30° to 60° to a direction parallel to the surface of the semiconductor substrate 150.

As shown in FIGS. 10B and 10C, the gamma rays IG enter the photodiode array 120 in which the photodiodes having a depth of 3 μm to 4 μm are arranged with a pitch of 1 μm to 2 μm, at an angle of incidence corresponding to the view angle of the image sensor to visible light. In this case, even if the recoil electrons SE have a component that moves in a direction perpendicular to the main surface of the semiconductor substrate 150, the recoil electrons SE move in the photodiode array 120 of the image sensor 10 across two or more photodiodes when the distance between the photodiodes and the depth of the photodiodes are taken into consideration.

Therefore, the track of the recoil electrons SE can be detected based on the gamma rays having an angle of incidence within the range of the view angle of the image sensor 10.

When the energy of the gamma rays IG is 500 keV to 1 MeV, the scattering angle θ1 of the scattered gamma rays SG ranges from about 0° to 30° with a certain degree of high probability. As shown in FIGS. 10A to 10C, suppose that the gamma rays IG enter the image sensor 10 at an angle of incidence within a range corresponding to the view angle (here, 60°) of the image sensor. In this case, the scattered gamma rays SG corresponding to the incoming gamma rays IG propagate toward the lower image sensor at an angle ranging from 0° to 60° with reference to the normal line to the surface of the semiconductor substrate 150.

Therefore, as in the cases shown in FIGS. 10A to 10C, if the incoming gamma rays IC are within the range of the angle of incidence θ1 from +30° to −30° with reference to the normal line to the surface of the semiconductor substrate 150, the scattered gamma rays are likely to enter the image sensor lower than the image sensor in which the first Compton scattering has been detected.

As described above, the recoil electrons SE move in the photodiode array 120 while losing energy. Thus, when the photodiode through which the recoil electrons SE have passed is located closer to the terminal of the track of the recoil electrons SE, the amount of the charge stored in the photodiode is smaller. As a result, an electric signal output from the photodiode at the terminal of the track of the recoil electrons SE is smaller than an electric signal output from the photodiode at the origin of the track of the recoil electrons SE.

As described above, the image sensor allows the detection of a Compton scattering and its occurrence position (coordinates) in the photodiode array, and the track of recoil electrons generated by the Compton scattering.

The scattered gamma rays SG enter the image sensor lower than the image sensor in which the first Compton scattering has occurred. The second Compton scattering occurs with a certain probability as a result of the scattered gamma rays SG which have entered the image sensor. The scattering angle and scattering direction of the scattered gamma rays SG can be indicated by conical ranges (radial regions) having vertexes at the photodiode 5 in which the first Compton scattering has occurred, in the same manner as the angle of incidence and incoming direction of the incoming gamma rays IG.

By the same operation performed by the image sensor $10_i$ as in the first detection unit 1, the image sensor $10_j$ as the second detection unit 2 traps and stores a charge generated by the recoil electrons in the Compton scattering (second Compton scattering) resulting from the scattered gamma rays SG. The position where the Compton scattering resulting from the scattered gamma rays SG has occurred can be detected by the reading of the stored charge. As a result, the occurrence position of the second Compton scattering can be acquired as positional information corresponding to the row and column of the photodiode array.

The occurrence position of the first Compton scattering, the movement direction of the recoil electrons in the first Compton scattering, and the occurrence position of the second Compton scattering are acquired by the output of signals from the image sensors 10 as the first and second detection units 1 and 2. Three-dimensional positional information in radiation detectors can be obtained by three pieces of information (coordinates) detected by the first and second detection units 1 and 2.

In accordance with the acquired three pieces of positional information, the analyzing unit (image processing circuit) 3 calculates a calculation plane including coordinates (points) corresponding to the three pieces of positional information. The calculation plane calculated in accordance with the three pieces of positional information includes the traveling direction (a straight line corresponding to the traveling direction) of the gamma rays.

Thus, the calculation plane including the direction in which the gamma rays have traveled is calculated by the first and second detection units 1 and 2 formed by the stack structure of the image sensors 10 in accordance with the positional information regarding the detected Compton scattering and the recoil electrons SE.

Figure 11:
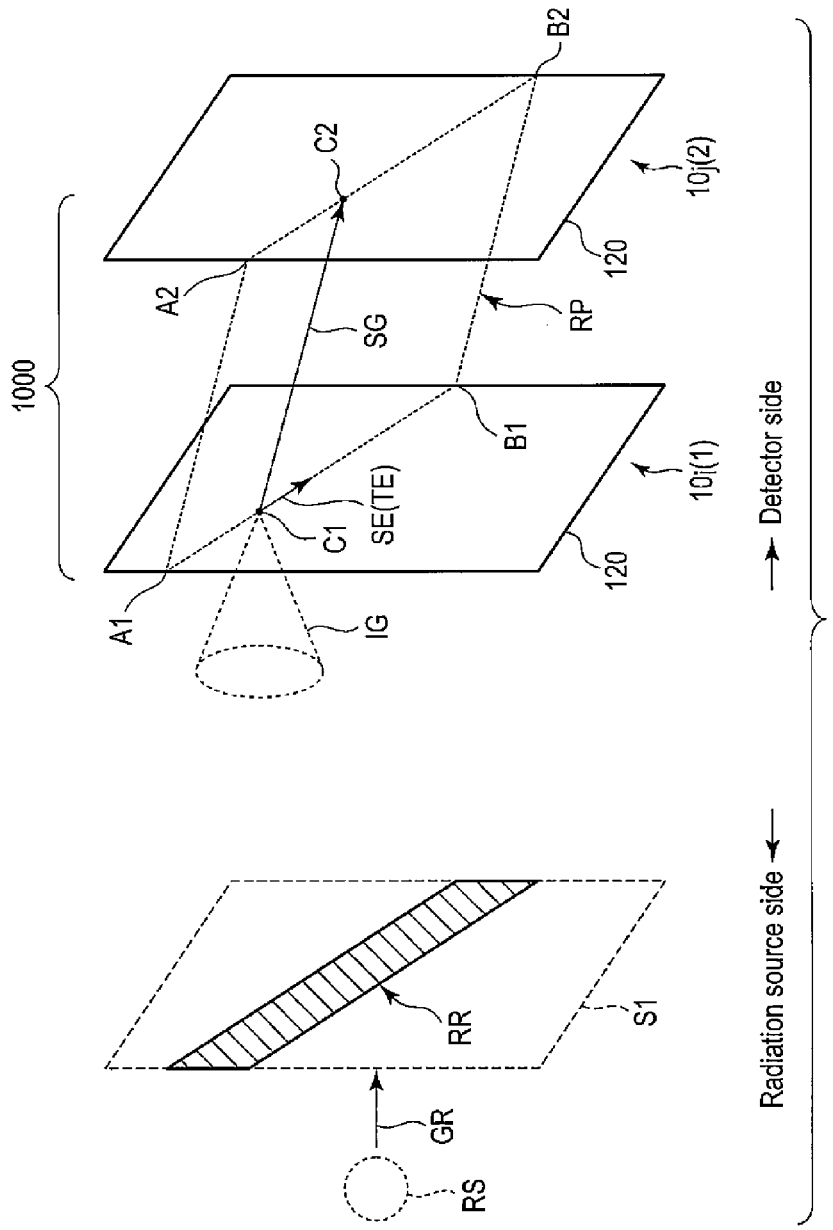
FIG. 11 is a diagram illustrating the detection of radiation in the radiation detector according to the embodiment.

FIG. 11 is a schematic diagram illustrating an example of how to analyze the traveling direction of radiation and the position of the radiation source in accordance with the detection of the multiple Compton scattering according to the embodiment.

As shown in FIG. 11, the radiation detector including the first and second detection units (image sensors) receives radiation GR from a certain radiation source RS.

The incoming gamma rays IG enter the image sensor $10_i$ as the first detection unit 1.

The Compton scattering resulting from the incoming gamma rays IG is detected as the first Compton scattering by the image sensor $10_i$ as the first detection unit 1. The position (the position of the photodiode in which the Compton scattering has been detected) C1 where the first Compton scattering has occurred is acquired as positional information (coordinates) indicated by the row and column of the photodiode array 120.

The charge generated by the recoil electrons SE resulting from the first Compton scattering is stored by the photodiode through which the recoil electrons SE have passed. As a result, the track TE of the recoil electrons SE is detected, and the track TE of the recoil electrons SE is acquired as positional information indicated by the row and column of the photodiode array 120.

The scattered gamma rays SG enter the second detection unit 2 (here, the image sensor) provided on the side of the radiation source RS opposite to the first detection unit 1, at a degree of a scattering angle corresponding to the energy of the incoming gamma rays IG.

The second Compton scattering resulting from the scattered gamma rays SG is detected by the image sensor $10_j$ as the second detection unit 2, and the position (the position of the photodiode in which the Compton scattering has been detected) C2 where the second Compton scattering has occurred is acquired as positional information indicated by the row and column of the photodiode array 120.

A signal obtained by the photodiode array is output to the analyzing unit 3 from the image sensor, and the analyzing unit 3 receives positional information indicating the occurrence position C1 of the first Compton scattering, positional information (e.g., the origin/end of the track) indicating the track TE of the recoil electrons, and positional information indicating the occurrence position C2 of the second Compton scattering. In accordance with the three pieces of positional information (three coordinates), the analyzing unit 3 forms the calculation plane RP used in the prediction and determination of the traveling direction of radiation.

For example, a straight line A1-B1 is formed in a plane (hereinafter also referred to as a frame) corresponding to the photodiode array 120 of the image sensor as the first detection unit 1 by the occurrence position C1 of the first Compton scattering and the track (the end of the track) TE of the recoil electrons.

A straight line A2-B2 is formed in a plane (frame) corresponding to the photodiode array 120 of the image sensor $10_j$ as the second detection unit 2. For example, the straight line A2-B2 of the image sensor $10_j$ is parallel to the straight line A1-B1 of the image sensor $10_i$. The positions of the straight line A1-B1 and the straight line A2-B2 in the normal direction (chip stacking direction) to the main surface of the image sensor shift in a direction parallel to the main surface of the image sensor in accordance with the scattering direction (the degree of the scattering angle) of the scattered gamma rays SG. As a result, the calculation plane RP is inclined in the normal direction of the light receiving surface (the main surface of the image sensor) of the radiation detector in accordance with the scattering direction (the degree of the scattering angle) of the scattered gamma rays SG.

For example, when the scattering angle of the scattered gamma rays SG is 0°, the occurrence coordinates of the first Compton scattering are located to overlap the occurrence coordinates of the second Compton scattering in the normal direction (image sensor stacking direction) to the main surface of the image sensor, and the straight line A1-B1 and the straight line A2-B2 overlap each other in the normal direction to the main surface of the image sensor.

The scattering direction of the scattered gamma rays SG corresponds to angle resolution for the prediction and determination of the traveling direction of radiation.

The plane RP calculated by the three pieces of positional information (three points) has vertexes at points A1, A1, B1, and B2 located at one end and the other of the straight line A1-B1 and the straight line A2-B2 set in the photodiode arrays 120 of the two image sensors $10_i$ and $10_j$.

The analyzing unit performs image processing (e.g., two-dimensional processing) that uses the calculation plane RP based on the three pieces of positional information C1, C2, and TE regarding the multiple Compton scattering. The calculation plane RP which has been subjected to the image processing is reflected in a two-dimensional plane (hereinafter also referred to as an observation plane or an analytic image) S1 on the side of the radiation source RS corresponding to the observation range of the radiation detector 1000.

In accordance with the result of the image processing of the calculation plane RP, a linear or zonal region (hereinafter referred to as a predictive region) RR is formed in the two-dimensional plane S1 on the side of the radiation source RS. It can be determined that the radiation source RS emitting the gamma rays IG and SG which have caused the multiple Compton scattering is likely to exist within a range indicated in the predictive region RR. For example, the predictive region RR is indicated by a linear or zonal planar shape having a certain width (line width). The width of the predictive region RR is generated by the position resolution of the photodiode array of the first and second detection units 1 and 2 (image sensors $10_i$ and $10_j$) corresponding to the size of the photodiode.

The accuracy in the identification of the traveling direction of the radiation GR and the position of the radiation source RS can be improved by calculating the calculation plane RP and the region RR for each of the multiple Compton scatterings in a space to be observed and thus calculating a plurality of calculation planes RP and predictive regions RR. For example, a region in which a plurality of predictive regions RR cross is determined to be a region (hot spot) where the radiation source RS is likely to exist.

Even if the direction (the occurrence position C1 of the first Compton scattering) of the gamma rays entering the image sensor as the first detection unit does not change, the track of the recoil electrons resulting from the gamma rays and the scattering direction of the scattered gamma rays vary with the detected multiple Compton scattering. Therefore, the shapes of the calculation plane RP and the predictive region RR corresponding to the gamma rays entering in the same direction vary with the detection sequence and analytic sequence of the radiation detector 1000.

As described above, the scattering angle of the scattered gamma rays depends on the energy of the incoming gamma rays. Thus, the region where the second Compton scattering occurs can be narrowed if the energy of the incoming gamma rays is assumed as being within a given range. This can improve the accuracy of the detection of the second Compton scattering, and improve the prediction/determination of the traveling direction of the radiation and the position of the radiation source.

Three or more detection units may be provided in the radiation detector (Compton camera) to detect the occurrence positions of three or more sequential Compton scatterings in the multiple Compton scattering and two or more tracks of recoil electrons and thereby calculate the calculation plane RP and the predictive region RR corresponding to the incoming gamma rays.

Thus, the radiation detector 1000 according to the present embodiment enables the traveling direction of the gamma rays and the position of the radiation source to be predicted and identified by the detection units 1 and 2 including a plurality of image sensors.

<Detection Conditions>

An example of detection conditions for radiation (scattering phenomenon resulting from radiation) in the radiation detector in which the image sensor is used as the radiation detection unit is described with reference to FIG. 12.

When a Compton scattering resulting from gamma rays is detected by a plurality of stacked image sensors, the rate of occurrence of the Compton scattering for one layer of the image sensor is about 0.1%. For example, when a Compton scattering is detected by ten layers of image sensors, the rate of detection of the multiple Compton scattering by the ten layers of image sensors is about 0.001%.

The relation between the absorbed dose of the radiation source, the number of photons entering the image sensor (the number of radiations), and the number of detections of the Compton scatterings is described with reference to FIGS. 12A to 12C.

FIG. 12A shows the relation between the absorbed dose of the radiation source and the radiation entering the radiation detector.

Here, the area of the photodiode array of the image sensor (detection unit) which radiation enters is set at 1 cm×1 cm. The depth of the photodiode is set at about 3 μm. The thickness of the silicon substrate forming the image sensor is set at about 60 μm. The transmittance of a radiation (gamma rays) of 662 keV in silicon having a thickness of 60 μm is about 99%. The absorbed dose of the radiation source is 10 μSv/h.

As shown in FIG. 12A, when a radiation source having an absorbed dose of 10 μSv/h is supposed, the number of photons (gamma rays) entering the photodiode array is 1000 ($1 \times 10^3$) per second, and is 60000 ($6 \times 10^4$) per minute. The number of incoming photons is 600000 ($6 \times 10^{15}$) when the receiving time (observation time) of radiation is 10 minutes. The number of incoming photons is 3600000 ($3.6 \times 10^6$) when the receiving time of radiation is 60 minutes (one hour).

FIG. 12B shows the relation between the number of stacked image sensors and the number of detections of the first Compton scattering (first scattering event) in the condition of FIG. 12A. FIG. 12C shows the relation between the number of stacked image sensors and the number of detections of the second Compton scattering (second scattering event) caused by one gamma ray in the condition of FIG. 12A. In FIGS. 12E and 12C, the number of detections of the Compton scattering per light receiving time (measurement time in the radiation detector) is shown.

The second scattering event is preferably detected ten or more times to improve the accuracy in the prediction and identification of the traveling direction of radiation and the position of the radiation source.

As shown in FIGS. 12B and 12C, under the condition of the radiation source shown in FIG. 12A, a radiation detector including ten layers of image sensors can detect the second scattering event ten or more times in the multiple Compton scattering when the light receiving time (measurement time) is set to 60 minutes.

A radiation detector including twenty layers of image sensors can detect the second scattering event ten or more times when the light receiving time is set to 10 or more minutes. The number of detections of the second scattering event during a certain period can be increased by the increase of the number of stacked image sensors that constitute the first and second detection units 1 and 2.

Thus, the number of stacked image sensors in the radiation detector and the light receiving time (measurement time) of radiation can be properly set to improve the accuracy for the determination of the traveling direction of radiation and the position of the radiation source.

The regions in the semiconductor substrate other than the photodiodes can be reduced in thickness to inhibit the generation of the Compton scattering in the image sensors other than the photodiodes.

Faults of detecting no Compton scattering can be reduced by the increase of the ratio of the depth (dimension in a direction perpendicular to the surface of the semiconductor substrate) of the diode to the thickness of the semiconductor substrate. For example, when a photodiode having a depth of about 10 μm is formed in the semiconductor substrate having a thickness of 60 μm, the detection rate of the Compton scattering per layer is about three times the detection rate when the depth of the photodiode is 3 μm.

If the semiconductor region that does not contribute to the detection of the Compton scattering is reduced by the reduction of the thickness of the semiconductor substrate 150, the occurrence of the Compton scattering outside the photodiode can be reduced. However, even if the thickness of the semiconductor substrate is reduced to maintain or increase the size of the photodiode relative to the thickness of the semiconductor substrate, the size (e.g., 1 to 2 μm) of the photodiode in a direction perpendicular to the surface of the semiconductor substrate is preferably not reduced.

The overall thickness of a multilayer interconnect structure (interconnect layer) on the surface of the semiconductor substrate in each image sensor is about several μm, and is smaller than the thickness of the silicon layer of each image sensor. The Compton scattering is predominant in a physical phenomenon caused by high-energy gamma rays. As the thickness of the metallic layer in the multilayer interconnect structure is much smaller than the thickness of the silicon layer, the Compton scattering is unlikely to occur in the metallic layer. Therefore, the Compton scattering which has occurred in the metallic layer is unlikely to have an adverse affect on the detection of the multiple Compton scattering by the photodiode.

Thus, the influence of the undetected Compton scattering can be further reduced by the adjustment of the number of stacked image sensors constituting the detection units and by the reduction of the thickness of the semiconductor substrate 150 that forms the image sensor.

As described above, it is possible to reduce adverse effects of the defective or erroneous detection of the Compton scattering on the processing for calculating the traveling direction of radiation and the position of the radiation source by properly setting the configuration and conditions for the detection of the multiple Compton scattering.

Consequently, the radiation detector according to the present embodiment is capable of predicting/determining the occurrence positions of the multiple Compton scattering, the traveling direction of radiation, and the position of the radiation source.

(3) Operation

The operation (radiation detection method) of the radiation detector according to the first embodiment is described with reference to FIG. 13, FIG. 14A and FIG. 14B. Here, FIG. 1 to FIG. 12 are also used as necessary to describe the operation of the radiation detector according to the first embodiment.

Figure 13:
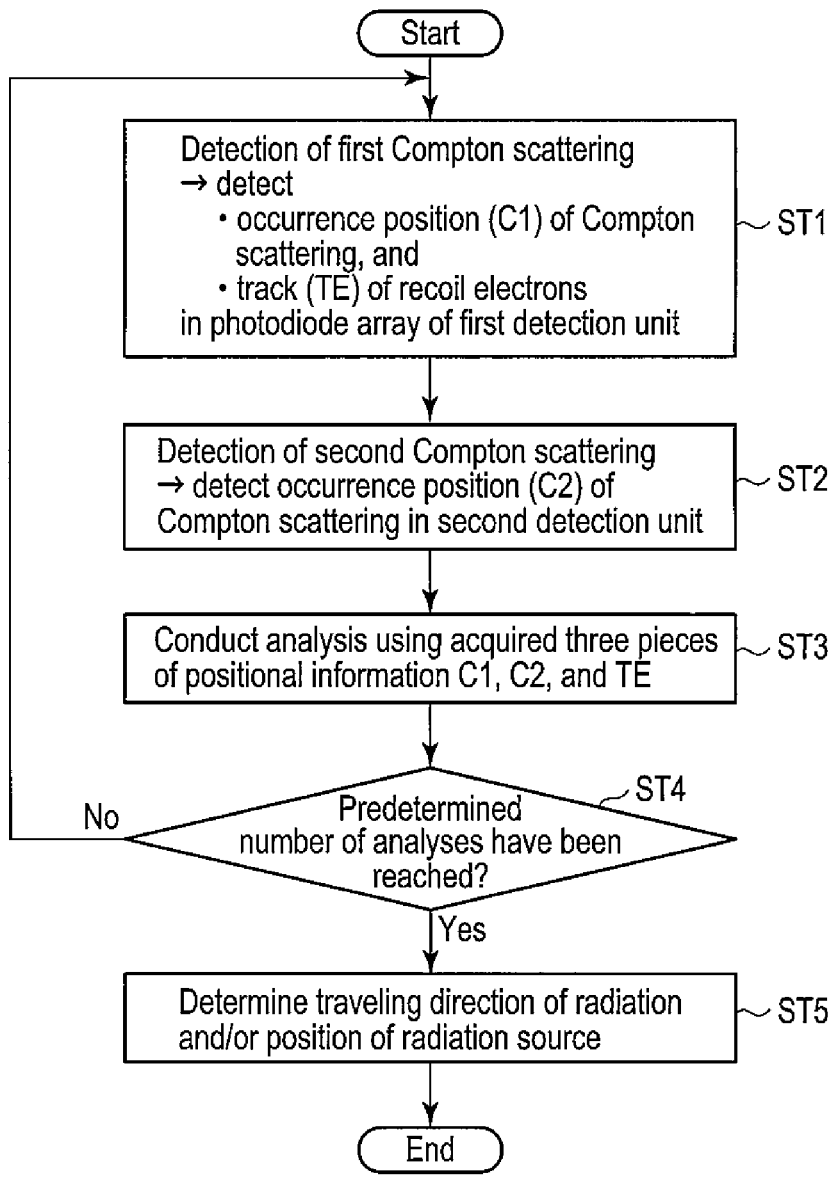
FIG. 13 is a flowchart showing an operation example of the radiation detector according to the first embodiment.

FIG. 13 is a flowchart illustrating the operation of the radiation detector according to the first embodiment. FIGS. 14A and 14B are diagrams illustrating an example of the operation of the radiation detector according to the first embodiment.

For example, as shown in FIG. 11, gamma rays GR from the radiation source RS enter the radiation detector 1000 when the radiation source RS exists in the space to be observed.

The first Compton scattering (interaction) resulting from the incoming gamma rays IG occurs in the image sensor $10_i$ which is one (here, the i-th image sensor) of the (n, e.g., n=20) image sensors included in the radiation detector 1000.

As shown in FIG. 13, the first Compton scattering resulting from the incoming gamma rays IG is detected by the image sensor $10_i$ (step ST1).

In the photodiode array 120 of the image sensor $10_i$ as the first detection unit 1, the photodiode 5 existing at the position C1 where the Compton scattering has occurred traps and stores a charge generated by the recoil electrons SE of the Compton scattering.

As described above, the scattered gamma rays SG and the recoil electrons SE are generated by the Compton scattering. The recoil electrons SE move in the photodiode array 120 of the image sensor $10_i$ while generating electron-hole pairs.

The charge resulting from the recoil electrons SE is trapped and stored in the photodiode 5 through which the recoil electrons SE have passed. As a result, the charge is stored not only in the photodiode at the position C1 in which the Compton scattering has occurred but also in the photodiode through which the recoil electrons SE have passed.

Thus, the i-th image sensor $10_i$ as the first detection unit 1 acquires information regarding the position (coordinates) C1 in the photodiode array 120 where the first Compton scattering resulting from the incoming gamma rays IG has occurred, and information regarding the position (e.g., coordinates of the origin, midpoint, or end of the track) of the track TE of the recoil electrons SE generated by the first Compton scattering.

The scattered gamma rays SG generated by the first Compton scattering have a scattering angle corresponding to the intensity of the energy of the incoming gamma rays IG, and thus propagate to the image sensor lower than image sensor $10_i$.

When the second Compton scattering resulting from the scattered gamma rays SG occurs in the j-th image sensor lower than the image sensor in which the first Compton scattering has occurred, the second Compton scattering continuing from the first Compton scattering is detected by the image sensor $10_j$ as the second detection unit 2 (step ST2).

In the image sensor $10_j$ in which the second Compton scattering has occurred, the charge resulting from the Compton scattering is trapped and stored in the photodiode 5 existing at the position C2 in the photodiode array 120 where the second Compton scattering has occurred.

Thus, the j-th image sensor $10_j$ as the second detection unit 2 acquires information regarding the position (coordinates) C2 in the photodiode array 120 where the second Compton scattering resulting from the scattered gamma rays SG has occurred.

As the gamma rays (photos) propagate in the first and second detection units 1 and 2 constituted by the image sensors 10 at the velocity of light, the first and second Compton scatterings in the multiple Compton scattering are detected substantially at the same timing if the operation cycle (e.g., an average detection period of 0.01 seconds) of the image sensor is taken into consideration.

Thus, the occurrence positions C1 and C2 of the first and second Compton scatterings regarding certain multiple Compton scattering and the track of recoil electrons are detected by the image sensors as the first and second detection units.

By predetermined control and timing, the signal retained by the photodiode is output to the noise elimination circuit, and the detection result in the image sensor 10 is transferred to the analyzing unit (image processing circuit) 3 from the image sensors 10 as the first and second detection units 1 and 2. The positional information indicating the occurrence positions C1 and C2 of the Compton scatterings and the track TE of the recoil electrons SE can be determined by information regarding the row and column of the photodiode array and the intensity of an electric signal corresponding to the amount of the charge stored in the photodiode.

Thus, the three-dimensional positional information regarding the multiple Compton scattering in the stacked image sensors 10 of the radiation detector 1000 can be acquired by the image sensors 10 as the first and second detection units 1 and 2.

Calculation processing to analyze the traveling direction of gamma rays is performed by the analyzing unit 3 in accordance with information indicating the occurrence position C1 of the first Compton scattering, the track TE of the recoil electrons SE, and the occurrence position C2 of the second Compton scattering (step ST3).

The analyzing unit 3 uses the occurrence position C1 of the first Compton scattering, the track TE of the recoil electrons SE, and the occurrence position C2 of the second Compton scattering to calculate the calculation plane RP including the traveling direction of gamma rays. For example, the calculation plane RP is a two-dimensional plane formed in a three-dimensional space corresponding to the stack structure of the image sensors 10.

The three pieces of information thus obtained by the stacked image sensors 10 as the first and second detection units 1 and 2 are used to obtain the calculation plane RP for predicting the traveling direction of radiation and the position of the radiation source in the space to be observed.

The second Compton scattering resulting from the scattered gamma rays SG corresponding to the first Compton scattering may not be detected even if the occurrence position C1 of the first Compton scattering and the track TE of the recoil electrons SE are detected. For example, the analyzing unit 3 judges by the output result from each image sensor whether the calculation processing is necessary. When the analyzing unit 3 judges by the output result (e.g., the superimposition of information regarding the row and column of each photodiode array) from each image sensor that the second Compton scattering following the first Compton scattering detected by a certain image sensor has not been detected by an image sensor lower than the former image sensor, the analyzing unit 3 does not perform the calculation processing for analyzing the traveling direction of radiation gamma rays. As a result, it is possible to reduce the processing that cannot obtain the calculation result of the calculation plane RP including the traveling direction of the radiation, and reduce system errors in the radiation detector and the load generated in the analyzing unit 3.

In order to improve the accuracy of the determination of the traveling direction of radiation and the position of the radiation source, it is preferable to calculate a plurality of calculation planes RP obtained from the multiple Compton scattering and the track of the recoil electrons SE in one space to be observed.

For example, the analyzing unit 3 judges whether the number of detected multiple Compton scatterings or the number of the calculation planes RP is equal to or more than a preset threshold (step ST4).

When the number of detected multiple Compton scatterings or the number of the calculated calculation planes is smaller than the threshold, the above-mentioned operation from steps ST1 to ST3 is again performed. The operation is repeated until the detection number or the calculation number becomes equal to or more than the threshold.

Therefore, a plurality of calculation planes RP are calculated for a certain space to be calculated. Thus, the accuracy in the prediction and determination of the traveling direction of radiation and the position of the radiation source can be improved by the multiple analytic processing (calculation of the calculation planes) for one space to be observed.

As described above, the occurrence position of the multiple Compton scattering and the track TE of the recoil electrons SE may vary with the detected multiple Compton scattering even for the gamma rays from the same radiation source. Therefore, the shape of the calculation plane RP may vary with the analytic result.

Figure 14A:
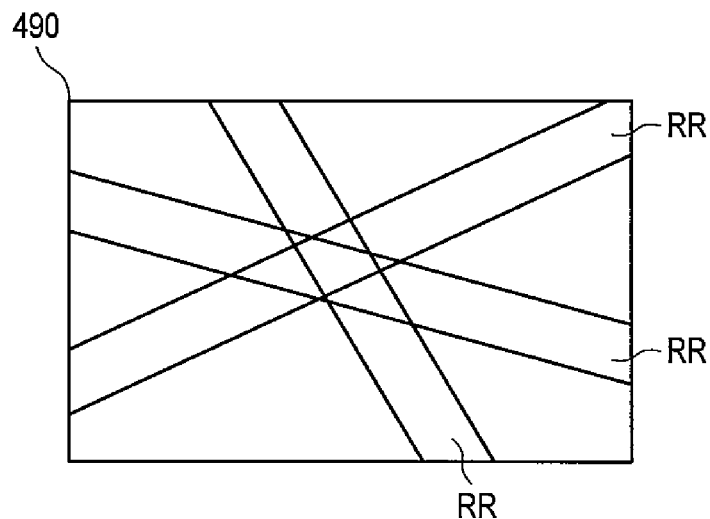
FIGS. 14A and 14B are diagrams illustrating an operation example of the radiation detector according to the first embodiment.

For example, as shown in FIG. 14A, the planes RP including the converted traveling direction of gamma rays are indicated on a two-dimensional image 490 as a plurality of zonal (or linear) predictive regions RR corresponding to the positional resolution (the size of the photodiode) of the photodiode array of the first and second detection units 1 and 2.

Figure 14B:
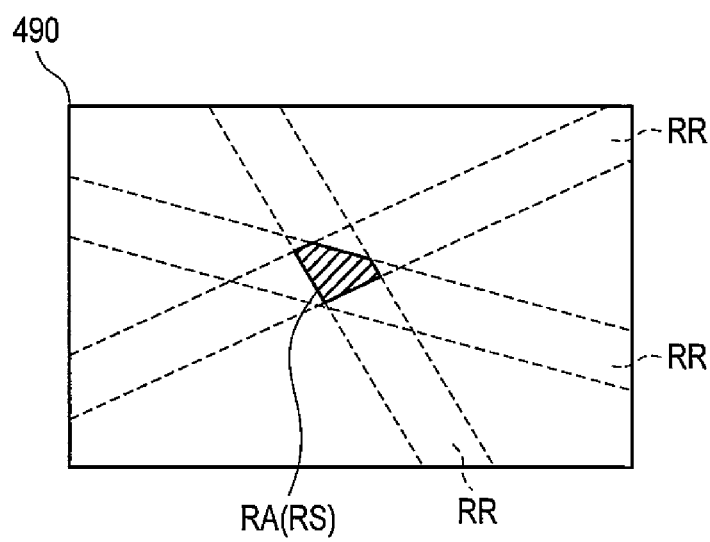

As shown in FIG. 14B, a region RA where the predictive regions RR overlap is likely to be the traveling direction of gamma rays. The region RA where the zonal predictive regions RR overlap is determined by the analyzing unit 3 as the traveling direction of radiation and the position (existence region) RA where the radiation source RS exists and in the space to be observed (step ST5).

The calculation result of the traveling direction of radiation and the position of the radiation source using the multiple Compton scattering and the track of the recoil electrons is output to the outside of the radiation detector, and the position of the radiation source is recognized by the user.

The determination of the traveling direction of radiation and the position of the radiation by the radiation detector is finished by steps ST1 to ST5.

As described above, the traveling direction of radiation and the position of the radiation source in a certain space can be predicted or determined by the radiation detector and the radiation detection method according to the first embodiment.

In the present embodiment, the traveling direction of radiation to the apparatus and the position of the radiation source in a certain space are predicted or determined by the detection of the multiple Compton scattering and the recoil electrons using a plurality of image sensors.

According to the present embodiment, the traveling direction of radiation and the position of the radiation source can be analyzed without the use of the energy of radiation. Therefore, a detection unit of radiation (and the Compton scattering) can be formed by a relatively inexpensive silicon device such as an image sensor without any configuration and function provided in the apparatus to detect the energy of radiation with accuracy. The detection units of radiation (Compton scattering) can be thus formed by a plurality of image sensors, so that a low-cost radiation detector can be provided.

The first and second detection units 1 and 2 of radiation and the multiple Compton scattering are formed by the image sensors, and the radiation detector 1000 can therefore be reduced in size.

It is thus possible to provide a new radiation detector by using a new radiation detection method (method of predicting/identifying the traveling direction of radiation and a radiation source).

Consequently, according to the present embodiment, it is possible to provide a small-sized radiation detector with a relatively low cost, and use this apparatus to detect radiation and a radiation source.

(C) SECOND EMBODIMENT

A radiation detector according to the second embodiment is described with reference to FIG. 15 to FIG. 17.

Here, for simplification of the explanation, the components described in the first embodiment are provided with the same reference signs, and substantially the same explanations of the functions and operations of these components are not given.

Figure 15:
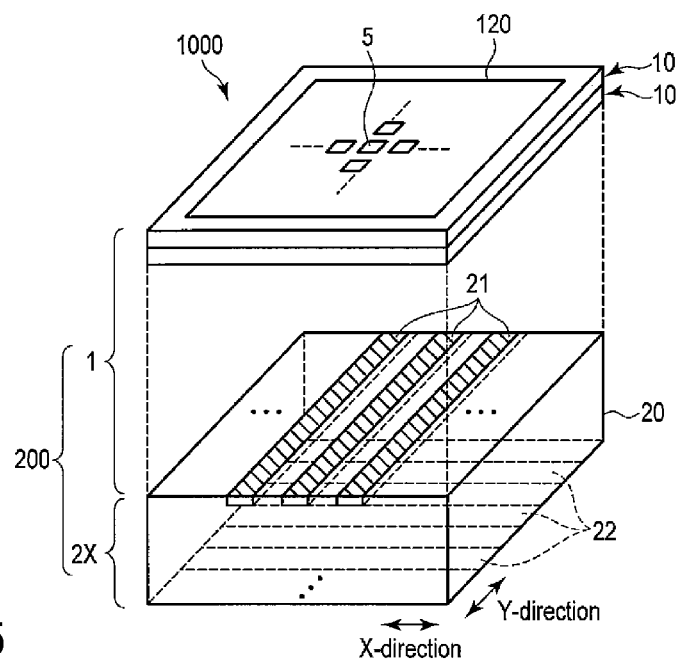
FIG. 15 is a schematic bird's-eye view showing the structure of a radiation detector according to a second embodiment.
Figure 16:
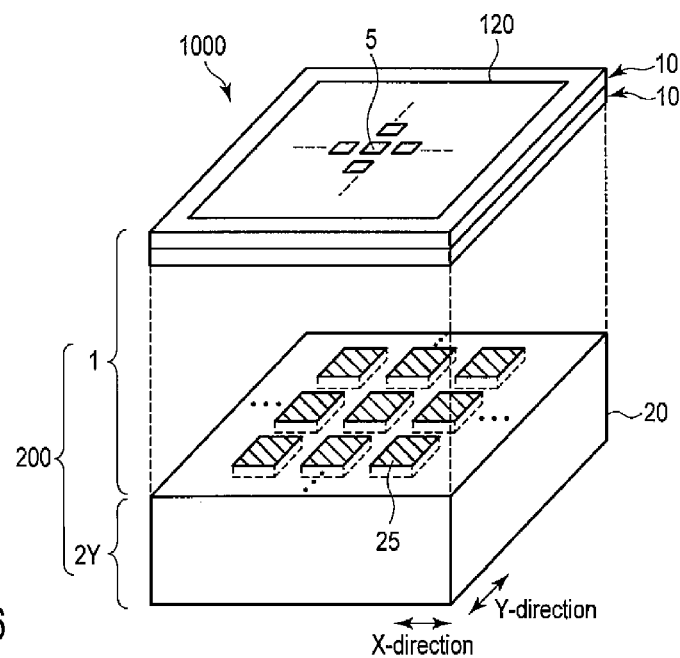
FIG. 16 is a schematic bird's-eye view showing the structure of the radiation detector according to the second embodiment.
Figure 17:
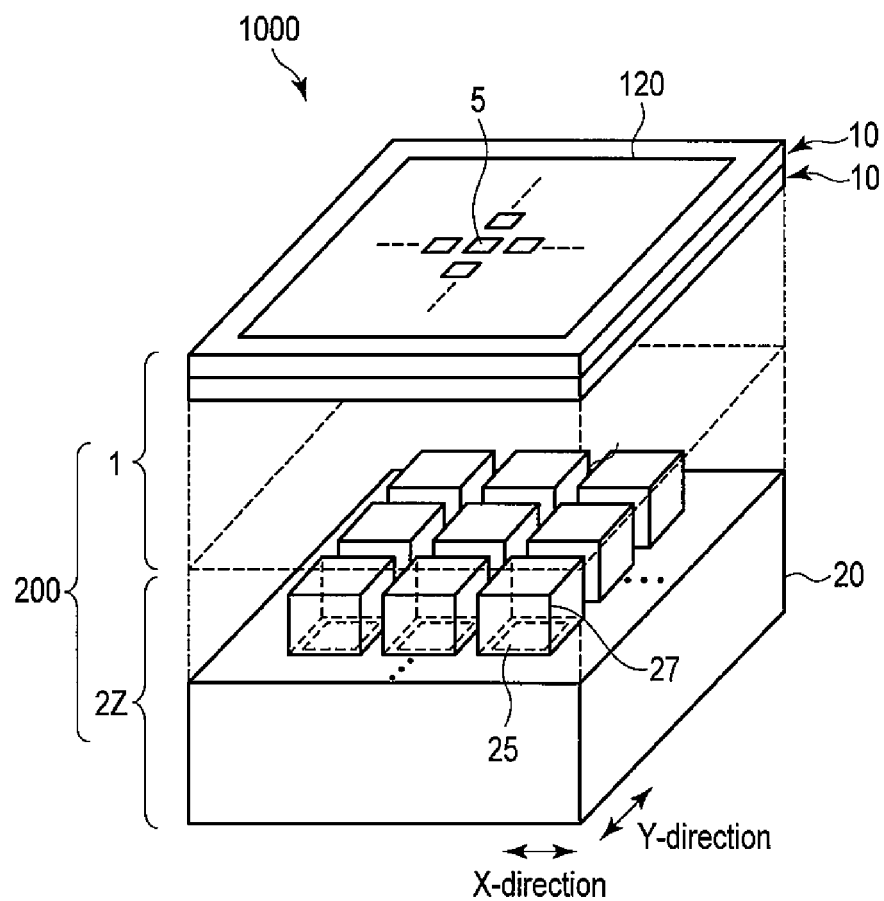
FIG. 17 is a schematic bird's-eye view showing the structure of the radiation detector according to the second embodiment.

FIG. 15 to FIG. 17 are schematic bird's-eye views showing structure examples of the radiation detector according to the second embodiment. In FIG. 15 to FIG. 17, the main parts of the radiation detector according to the second embodiment are extracted and shown.

As has been described in the first embodiment, a first detection unit 1 detects the occurrence position of a first Compton scattering in multiple Compton scattering, and the track of recoil electrons generated by the Compton scattering. A second detection unit 2 has only to be able to detect the occurrence position of a second Compton scattering resulting from scattered gamma rays generated by the first Compton scattering, and does not need to detect the track of the recoil electrons.

Therefore, as shown in FIG. 15 to FIG. 17, second detection units 2X, 2Y, and 2Z may be any devices other than image sensors as long as these devices can detect the position at which radiation (gamma rays) has entered their radiation detection regions. In this case, some of the detection devices detect not only the Compton scattering but also a charge generated by the interaction resulting from a photoelectric effect (photoelectric absorption), and can thereby detect the incidence position of scattered gamma rays.

For example, in order to improve the rate of the detection of the incidence position of the scattered gamma rays after the first Compton scattering, a device which is higher in the detection rate of the gamma rays than an image sensor 10 is used as the second detection unit 2Z.

For example, a strip-type gamma ray detection device, a pixel-type gamma ray detection device, or a gamma ray detection device including a scintillator is used as the second detection unit 2 of the radiation detector according to the second embodiment.

FIG. 15 is a schematic diagram showing a structure example of the strip-type gamma ray detection device.

As shown in FIG. 15, a strip-type (e.g., cross-strip-type) gamma ray detection device 2X has a plurality of detection elements (strips) 21 extending in the Y-direction, and a plurality of detection elements (strips) 22 extending in the X-direction that intersects (at right angles) with the Y-direction. Each of the strips 21 and 22 has a linear planar shape. Each of the strips 21 and 22 is a semiconductor region provided in a semiconductor substrate 20.

In a direction perpendicular to the main surface of the semiconductor substrate 20, the strips 21 extending in the Y-direction are provided at a height different from that of the strips 22 extending in the X-direction. The strips 21 extending in the Y-direction and the strips 22 extending in the X-direction intersect with each other in a direction perpendicular to the main surface of the semiconductor substrate 20.

FIG. 16 is a schematic diagram showing a structure example of the pixel-type gamma ray detection device.

As shown in FIG. 16, a pixel-type gamma ray detection device 2Y has a plurality of rectangular detection elements 25 which are two-dimensionally arranged along the X-direction and the Y-direction in the substrate 20.

The detection elements 21, 22, and 25 of the strip-type and pixel-type gamma ray detection devices 2X and 2Y are made of, for example, silicon (Si), germanium (Ge), cadmium telluride (CdTe), or cadmium zinc telluride (CdZnTe). For example, in the strip-type gamma ray detection device 2X, the Si strips 21 and 22 have a thickness of about 100 μm. The CdTe strips 21 and 22 have a thickness of about 500 μm.

When the strip-type and pixel-type gamma ray detection devices are made of Ge, CdTe, or CdZnTe, gamma ray detection sensitivity can be higher than that of the CMOS image sensor.

For example, when the pixel-type gamma ray detection device 2Y is made of silicon, an avalanche photodiode or a silicon photomultiplier (SiPM) is used.

The strips 21 and 22 and the avalanche photodiode 25 detect gamma rays.

In the strip-type and pixel-type gamma ray detection devices 2X and 2Y, the distance (pitch) between the adjacent detection elements is larger than the distance between the photodiodes (unit cells) of the image sensor. In the strip-type gamma ray detection device 2X, the distance between the strips 21 adjacent in a direction parallel to the surface of the substrate is set at about 400 μm to 1 mm.

For example, in the strip-type and pixel-type gamma ray detection devices 2X and 2Y, the area of the element for detecting gamma rays is larger than the area of the photodiode of the image sensor. The number of the elements for detecting gamma rays included in the strip-type and pixel-type gamma ray detection devices 2X and 2Y is smaller than the number of the photodiodes provided in the image sensor. The number of pixels in the strip-type and pixel-type gamma ray detection devices 2X and 2Y is smaller than the number of pixels in the image sensor. For example, the resolution of the strip-type and pixel-type gamma ray detection devices 2X and 2Y is about 16 K (128×128) pixels.

These strip-type and pixel-type gamma ray detection devices 2X and 2Y can improve the gamma ray detection sensitivity as compared with the CMOS image sensor (photodiode). As a result, the detection rate of the incidence position of scattered gamma rays in the radiation detector can be improved.

As shown in FIG. 17, a scintillator 27 may be provided on the detection element 25 of the gamma ray detection device.

The scintillator 27 generates light (scintillates) with a high sensitivity in response to incoming radiation.

Gamma rays and highly sensitive light generated by the scintillator 27 because of the gamma rays are detected by the lower detection element 25. This improves the gamma ray detection sensitivity in the second detection unit 2Z.

For example, when the scintillator 27 is combined with the strip-type or pixel-type detection device, NaI, gadolinium silicate (GSO), bismuth germanate (BGO), or lutetium silicate (LSO) is used as the material of the scintillator 27.

When the position of a radiation source is determined by one of the radiation detectors shown in FIG. 15 to FIG. 17, the first Compton scattering is detected by a plurality of stacked image sensors, and the incidence position (e.g., the occurrence position of the second Compton scattering) of scattered gamma rays is detected by the gamma ray detection devices 2X, 2Y, and 2Z having a higher sensitivity than the image sensors.

Even when a radiation detection device different from the image sensor is used as the second detection unit of the radiation detector, the radiation detector according to the second embodiment can predict and determine the traveling direction of radiation and the position of a radiation source by the operation substantially similar to that in the first embodiment.

The radiation detector according to the second embodiment can bring about advantageous effects similar to those in the first embodiment, and detects the incidence position of gamma rays scattered by the first Compton scattering with a sensitivity higher than that of the image sensor, so that the time required to calculate the incoming direction of the gamma rays to the radiation detector can be reduced.

(D) APPLICATION

The application of the radiation detector according to the embodiment is described with reference to FIG. 18 to FIG. 23. In the present embodiment, the same components and operations as those in the first and second embodiments are described when necessary.

(1) Structure

Figure 18:
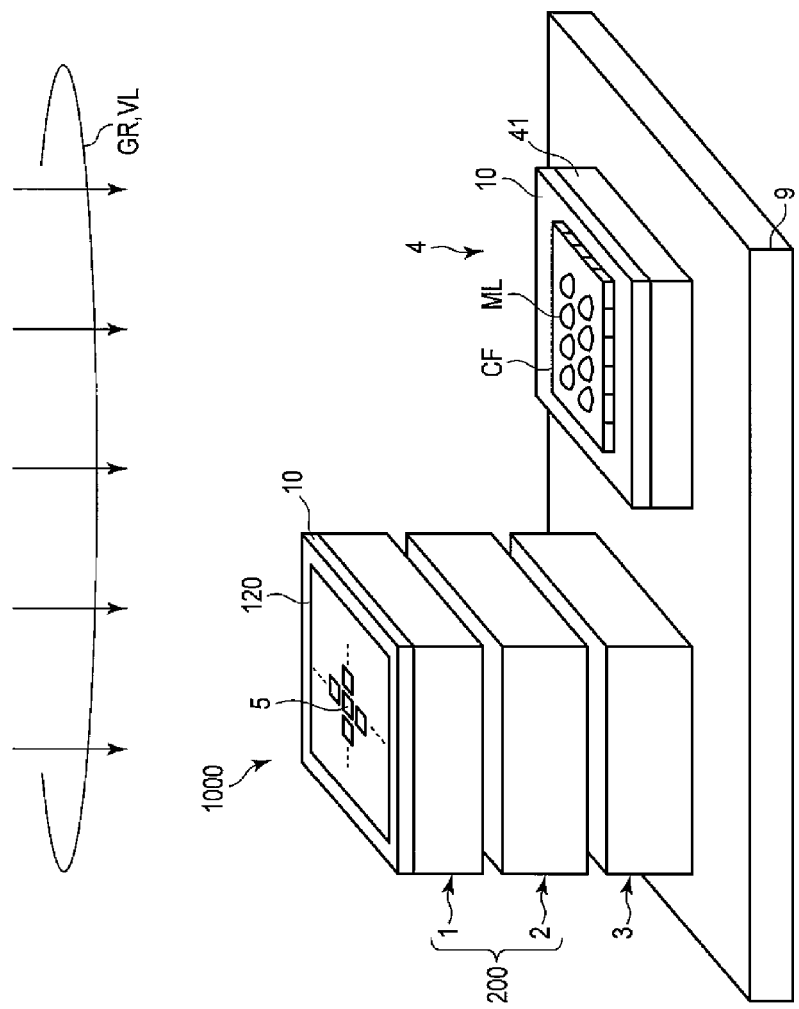
FIG. 18 is a schematic bird's-eye view showing a structure example of the application of the radiation detector according to the embodiment.

The application of the radiation detector according to the embodiment is described with reference to FIG. 18 and FIG. 19. FIG. 18 is a schematic bird's-eye view showing the structure of the application of the radiation detector according to the embodiment. FIG. 19 is a block diagram showing a structure example of the application of the radiation detector according to the embodiment. Although the first and second detection units according to the first embodiment are used here, the first and second detection units according to the second embodiment may be used.

The position of a radiation source obtained by the radiation detector according to the embodiment is displayed on a visible-light image of a space including the radiation source so that the user will easily recognize the position of the radiation source in a certain space.

Thus, the radiation detector according to the embodiment is configured to include an imaging device for imaging the space including the radiation source.

As shown in FIG. 18 and FIG. 19, an imaging device 4 for imaging a space (subject) is provided on the same support substrate 9 as the detection units 1 and 2 including the image sensor 10 in the radiation detector 1000 according to the embodiment.

The imaging device 4 for imaging a certain space OJ forms a visible-light image by photoelectrically converting visible light. The imaging device 4 is, for example, an image sensor.

For example, when the image sensor 4 for imaging a space is a CMOS image sensor, this image sensor 4 has a configuration similar to the configuration shown in FIG. 5.

Hereinafter, for differentiation, the image sensor as the imaging device is referred to as a visible-light sensor, and the photodiode array included in the visible-light sensor is referred to as a pixel array.

The visible-light sensor has a color filter CF and a microlens array ML that are provided at positions overlapping the pixel array in a direction perpendicular to the main surface of the semiconductor chip. The color filter CF and the microlens array ML are provided on the light-receiving side of the photodiode array 120.

The photodiode corresponding to a pigment coat of each color photoelectrically converts light (visible light) from the space OJ that may include a radiation source, and an electric signal corresponding to each of the photoelectrically converted color components is generated. The electric signal output from the pixel array is subjected to AD conversion and CDS processing by the noise elimination circuit, and noise is eliminated from the electric signal.

As shown in FIG. 18 and FIG. 19, the electric signal acquired by the CMOS image is processed by, for example, an LSI 41 including a digital signal processor (DSP) and an image signal processor (ISP), and an image of the observed and photographed space (space in which the radiation source RS may exist) OJ is formed. For example, the LSI 41 may be provided between the visible-light sensor 4 and the support substrate 9, or may be formed in the same semiconductor substrate as the pixel array of the visible-light sensor 4.

An image composing unit 42 superimposes the image of the photographed space on the traveling direction of radiation and the position of a radiation source that have been calculated. The image composing unit 42 may be provided in the analyzing unit 3 or the LSI 41, or may be provided on the support substrate 9 as a chip separate from the analyzing unit 3 or the LSI 41.

Image data (hereinafter referred to as composite image data) in which the position of the radiation source (the traveling direction of the radiation) is superimposed on the visible-light image of the space is displayed on a display unit 43 (e.g., a liquid crystal display). Thus, the position of the radiation source in the photographed space is indicated on the image so that the user recognizes this position.

In this way, the visible-light image data regarding the space to be observed is composed with the traveling direction of radiation and the position of the radiation source that have been obtained by the radiation detector 1000 according to the embodiment. Consequently, the traveling direction of radiation and the position of the radiation source can be visualized.

The first detection unit 1 formed by the image sensor may function as an imaging device to obtain an image of a subject. For example, the color filter and the microlens are attached to the uppermost image sensor (first image sensor) among a plurality of image sensors so that visible light can be photoelectrically converted. Thus, the uppermost image sensor functions as a radiation sensor (detection unit), and also functions as a visible-light sensor (imaging device).

The visible-light sensor 4 for imaging the space to be observed may be provided on the same support substrate 9 as the radiation detector 1000, or may be provided on a substrate different from that of the radiation detector 1000. The chip of the visible-light sensor 4 may be stacked on the stack structure of the first and second detection units 1 and 2. When the visible-light sensor is stacked on the first detection unit 1, the area of the radiation detector on the support substrate 9 can be reduced. The visible-light sensor 4 may be an image sensor such as a CCD image sensor or a back side illumination type CMOS image sensor that has a configuration different from that of the image sensor as the first detection unit 1. If the superimposition of the visible-light image data and the position of the radiation source are taken into consideration, the visible-light sensor 4 preferably has the same number of pixels and the same image size as the image sensor as the detection unit.

The LSI 41, the image composing unit 42, and the display unit 43 may be provided in a device (e.g., computer) different from the radiation detector 1000 and the visible-light sensor 4.

(2) Operation

The operation of the application of the radiation detector according to the embodiment is described with reference to FIG. 20 and FIG. 21. FIG. 18 and FIG. 19 are also properly used to describe the operation of the application of the radiation detector according to the embodiment. For simplification of the explanation, the operation which is substantially the same as the above-mentioned operation of the radiation detector according to the embodiment is described when necessary.

Figure 20:
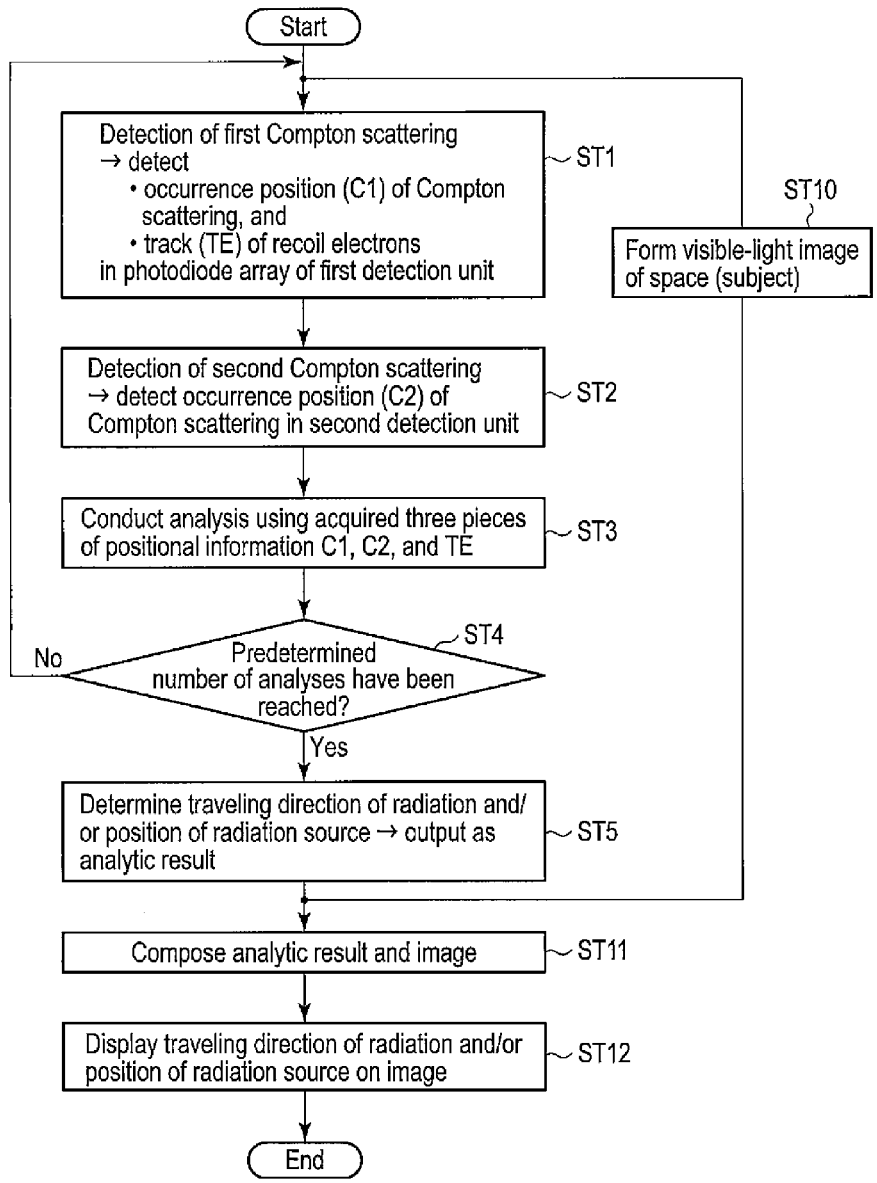
FIG. 20 is a flowchart of an operation example of the application of the radiation detector according to the embodiment.

FIG. 20 is a flowchart showing an example of the operation of the radiation detector according to the application. FIG. 21 is a diagram illustrating an example of the operation of the radiation detector according to the application.

Gamma rays from the radiation source enter the radiation detector 1000 which includes the first and second detection units. Accordingly, light from the subject including the radiation source enters the image sensor as the imaging device.

Figure 21:
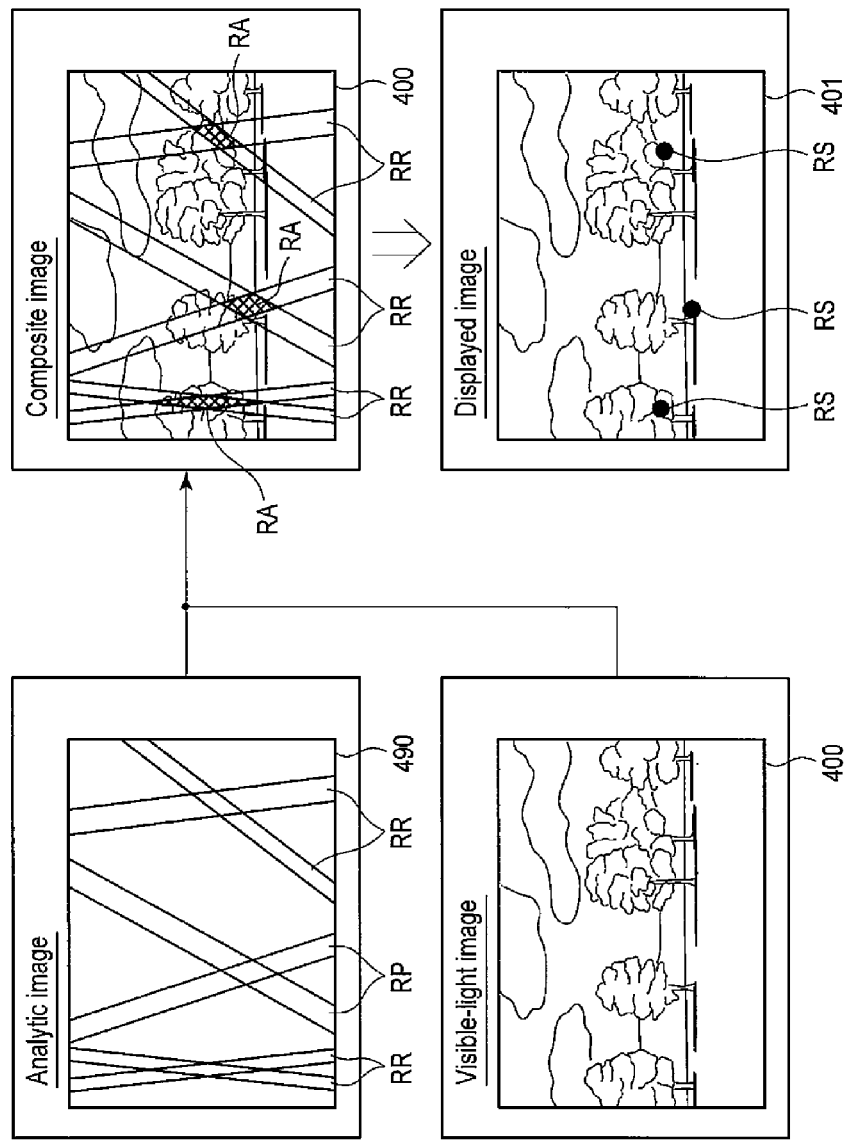
FIG. 21 is a diagram illustrating an operation example of the application of the radiation detector according to the embodiment.

As shown in FIG. 20 and FIG. 21, the first and second detection units 1 and 2 detect the occurrence position of the first Compton scattering in multiple Compton scattering, the track of recoil electrons, and the occurrence position of the second Compton scattering, in substantially the same manner as the operation described with reference to FIG. 13 and FIG. 14 (steps ST1 to ST4). The traveling direction of radiation and the position of the radiation source are predicted and determined by the calculation of the detection results of the multiple Compton scatterings performed by the image sensor as shown in FIG. 20 (step ST5).

As shown in FIG. 20 and FIG. 21, a visible-light image of the space to be observed by the radiation detector 1000 is formed by the visible-light sensor 4 in parallel with the detection of the multiple Compton scattering by the first and second detection units 1 and 2 and its calculation processing (step ST10).

The light from the subject is photoelectrically converted by the photodiodes in the pixel array of the visible-light sensor 4. The photoelectrically converted signal (signal charge) is read by a predetermined operation from each of the photodiodes by the rows of the pixel array. Signal data which has been subjected to noise elimination is output to the LSI 41 from the visible-light sensor 4.

The obtained image of the space to be observed is formed by the LSI 41 in accordance with a one-frame signal from the visible-light sensor 4.

The image of the space to be observed which has been acquired by the visible-light sensor is superimposed (composed with) on the position of the radiation source in the space to be observed which has been analyzed by the radiation detector 1000 (step ST11).

As shown in FIG. 20, the detection results of the multiple Compton scattering and the track of the recoil electrons by the first and second detection units 1 and 2 are analyzed by the analyzing unit 3. The analytic result is displayed on the two-dimensional analytic image (observation plane) 490 as the zonal or linear predictive region RR. Image data 400 regarding the observation space is formed by the visible-light sensor 4 and the LSI 41.

The analytic image 490 is formed by the analyzing unit 3 to correspond to the specifications (e.g., a frame size, a view angle, resolution) of the image (visible-light image) 400 formed by the visible-light sensor 4.

The analytic image 490 and the visible-light image 400 are superimposed on each other by the image composing unit 42. As has been described with reference to FIG. 13, the radiation source determined by the radiation detector is likely to exist at the position (determination region) RA where the predictive regions RR cross.

As shown in FIG. 21, the position RA where the radiation source is likely to exist is marked, and this mark RS is indicated on the visible-light image 400.

The result of the composition of the images 490 and 400 is output to the display unit 43 from the image composing unit 42, and an image 401 including the mark RS that indicates the position of the radiation source is displayed on the liquid crystal display as the display unit 43.

When there is no radiation source in the observation space (or when the intensity of radiation is lower than the measurement limit of the apparatus), no mark that indicates the position of the radiation source is displayed on the display.

As described above, the radiation detector according to the application of the embodiment can display the traveling direction of radiation and the position of a radiation source determined in a certain observation space on the visible-light image of a certain observation space.

Consequently, the radiation detector according to the application of the embodiment displays the traveling direction of radiation and the position of a radiation source on a screen, and can thereby visualize the traveling direction of radiation and the position of a radiation source that are difficult to visually observe.

(E) MODIFICATIONS

Modifications of the radiation detector according to the embodiment are described with reference to FIG. 22 and FIG. 23.

Modification 1

Figure 22:
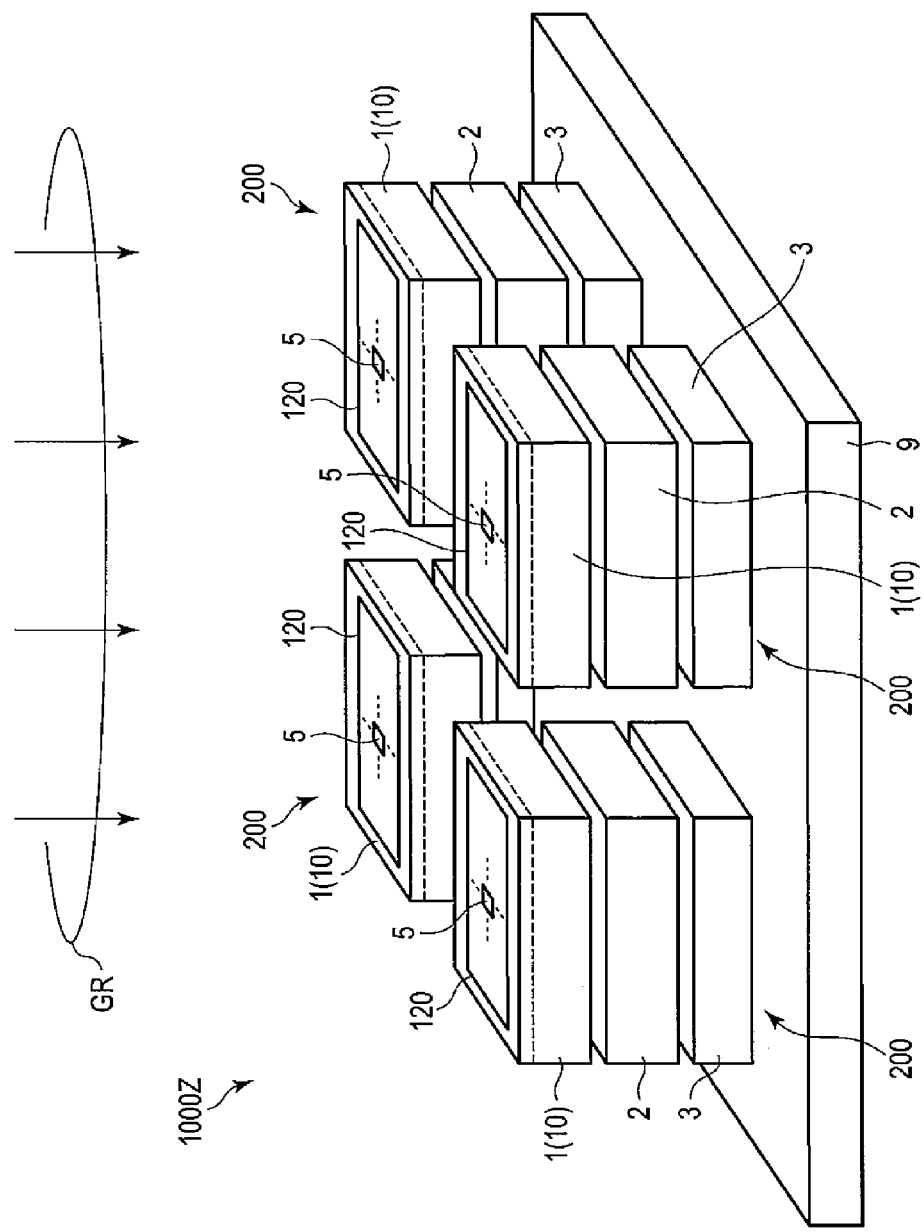
FIG. 22 is a diagram showing a modification of the radiation detector according to the embodiment.

FIG. 22 is a schematic bird's-eye view showing the modification of the radiation detector according to the embodiment.

A plurality of stack structures 200 including the first and second detection units 1 and 2 may be provided on one support substrate 9 to be adjacent to one another in a direction parallel to the surface of the support substrate 9.

The analyzing unit 3 may be provided for each of the stack structures 200 of the first and second detection units. One analyzing unit 3 may be shared by a plurality of stack structures 200.

In the present modification, one radiation detector is formed from a plurality of stack structures 200 arranged in a direction parallel to the surface of the support substrate 9, so that the radiation GR can be received from a wide range. As a result, the space that can be measured by one radiation detector within a certain measurement period can be increased, and the traveling direction of radiation and the position of a radiation source in a large space can be identified.

Modification 2

It is also possible to measure the intensity of radiation generated from a radiation source by using the radiation detector 1000 according to the embodiment to count the number of Compton scatterings detected within a predetermined light-receiving period.

The radiation detector 1000 according to the embodiment can also detect the number of gamma rays (the number of photons) entering the radiation detector 1000 by counting the number of Compton scatterings generated in the image sensors that constitute the first and second detection units 1 and 2.

For example, the number of gamma rays entering the radiation detector 1000 may be detected by counting the number of Compton scatterings generated in one image sensor (e.g., the chip of the uppermost image sensor), or by performing operational processing for the number of Compton scatterings generated in two or more image sensors in the radiation detector 1000. However, the number of image sensors 10 used to measure the intensity of radiation is preferably set in consideration of the generation and detection period of the multiple Compton scattering.

When the radiation detector 1000 according to the embodiment is used to measure the intensity of the radiation source/radiation, the analyzing unit 3 calculates the intensity of the radiation on the basis of a numerical table in which the number of occurrences of Compton scattering is associated with the intensity of the radiation. The numerical table for obtaining the intensity of the radiation source may be stored in, for example, a storage region in the analyzing unit 3 in a temporary or nonvolatile form, or may be stored in a storage (e.g., HDD, SSD, memory card) outside the radiation detector 1000. The numerical table for determining the intensity of the radiation may be provided for each nuclear species of the radiation source.

Thus, the radiation detector 1000 according to the embodiment can not only determine the traveling direction of radiation and the position of a radiation source but also measure the amount of radiation and the intensity of a radiation source in a predetermined space, in accordance with the number of occurrences of Compton scattering.

Modification 3

Figure 23:
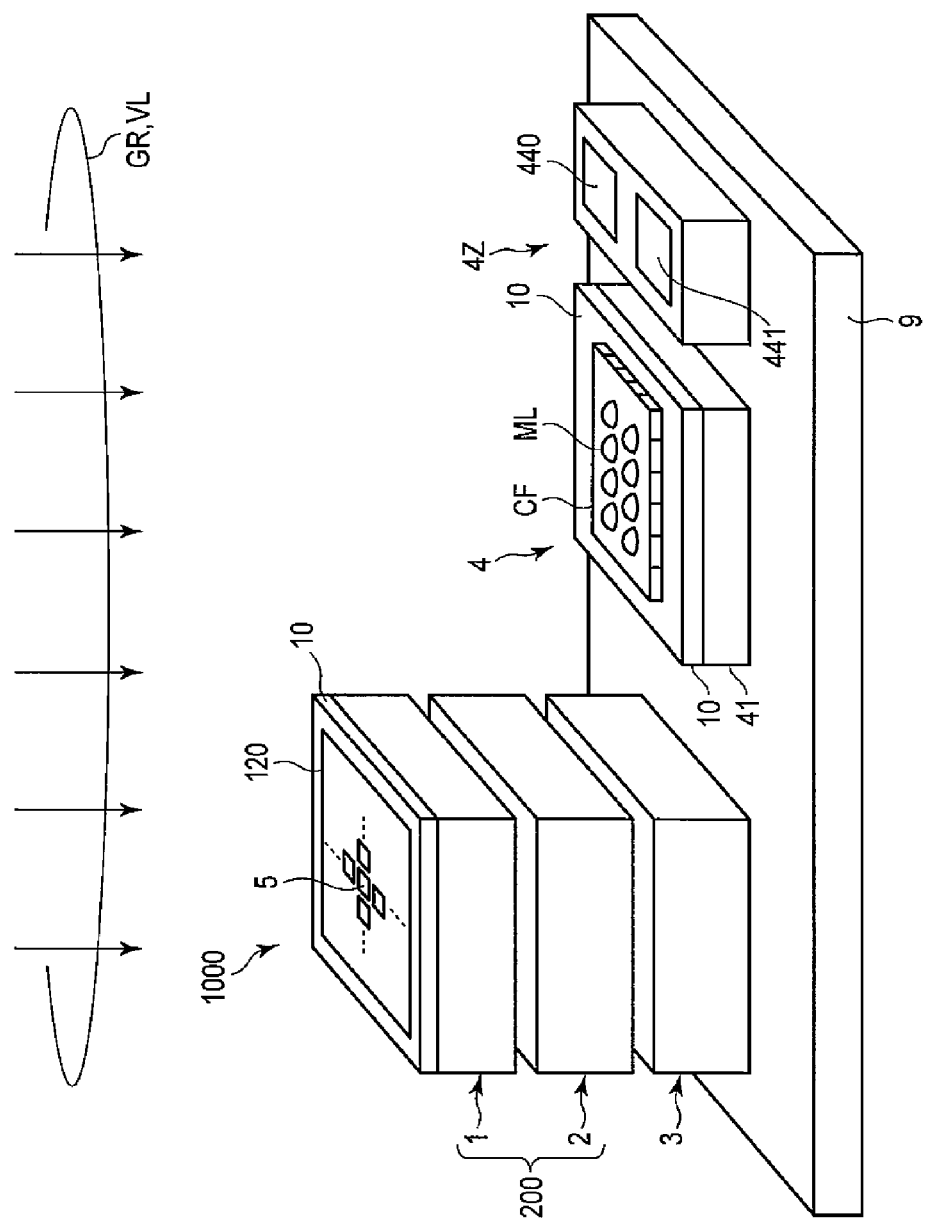
FIG. 23 is a diagram showing a modification of the radiation detector according to the embodiment.

FIG. 23 is a schematic diagram showing an example of the modification of the radiation detector according to the embodiment.

The radiation detector in FIG. 23 includes a distance measurement sensor 4Z together with the first and second detection units that include the image sensors. The distance measurement sensor 4Z measures the distance between the space (radiation source) to be observed and the radiation detector 1000. For example, the distance measurement sensor 4Z includes an infrared illuminator (e.g., infrared laser) 440, and an infrared sensor 441. The infrared illuminator 440 emits infrared rays toward the space (subject) to be observed. The infrared sensor 441 detects the intensity of the infrared rays reflected by the space to be observed, and compares the detected intensity of the infrared rays with a reference value. In this way, the distance between the radiation detector and the space to be observed is measured.

As described above, the radiation detector according to the embodiment can measure the intensity of the radiation source in accordance with the count of Compton scatterings generated in the detection units, and find the absorbed dose (unit: Sv/h) of the radiation source from the measurement value. The distance between the radiation source measured by the distance measurement sensor 4Z and the radiation detector 1000 can be used to convert the measurement unit of the radiation source from "Sv/h (sievert)" to "Bq (becquerel)". Thus, the amount (radioactivity) of a radioactive substance in the radiation source assuming a certain nuclear species can be found.

(D) OTHER

The radiation detector according to each of the embodiments described above may be formed into a module.

As described above, the radiation detector 1000 according to the embodiment includes one or more image sensors as the radiation detection units. Therefore, the detection units of the image sensors can be provided on the same support substrate as the image sensor 4 for forming the visible-light image and the LSI 41 including, for example, DSP in FIG. 18 and FIG. 19.

For example, the radiation detector according to the embodiment may be provided in a digital camera or a camera-equipped mobile telephone. The radiation detector according to the embodiment may also be provided as an external unit attachable to and removable from a digital camera or a camera-equipped mobile telephone.

Thus, a module including the radiation detector according to the embodiment can be provided.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A radiation detector comprising:
   a first detection unit provided on a substrate, the first detection unit including at least one semiconductor chip having a first radiation entrance region which external incoming radiation enters and in which a plurality of first photoelectric conversion elements are arranged in matrix form, the first detection unit detecting an occurrence position of a first interaction resulting from the incoming radiation in the first radiation entrance region and a direction in which a recoil electron is scattered by the first interaction in the first radiation entrance region by using the first photoelectric conversion elements, the occurrence position of the first interaction corresponding to a position where the recoil electron is generated by the first interaction; and
   a second detection unit which is provided between the substrate and the first detection unit and which includes a second radiation entrance region which scattered radiation resulting from the first interaction enters, the second detection unit detecting an occurrence position of a second interaction resulting from the scattered radiation in the second radiation entrance region,
   wherein a position of a radiation source which emits the incoming radiation in a space to be observed is measured by using the occurrence position of the first interaction, the occurrence position of the second interaction, and the direction in which the recoil electron is scattered.

2. The radiation detector according to claim 1, wherein the first and second detection units are image sensors in which pixel circuits configured to photoelectrically convert incoming light and store a generated charge are arranged in matrix form.

3. The radiation detector according to claim 1, wherein each of the first photoelectric conversion elements is provided in a pixel circuit in the first radiation entrance region, and
   the pixel circuit includes a floating diffusion to which a charge from the first photoelectric conversion element is output, and a first field effect transistor having a current path which connects the first photoelectric conversion element to the floating diffusion.

4. The radiation detector according to claim 1, wherein the first detection unit is an image sensor in which pixel circuits configured to photoelectrically convert incoming light and store a generated charge are arranged in matrix form, and the second detection unit is a gamma ray detection device.

5. The radiation detector according to claim 1, wherein the radiation detection sensitivity of the second detection unit is higher than the radiation detection sensitivity of the first detection unit.

6. The radiation detector according to claim 1, wherein the second detection unit includes a plurality of radiation detection elements in the second radiation entrance region.

7. The radiation detector according to claim 6, wherein the second detection unit further includes scintillators respectively provided on the radiation detection elements.

8. The radiation detector according to claim 6, wherein
a size of the radiation detection elements are larger than a size of the first photoelectric conversion elements, and
a distance between the first photoelectric conversion elements is smaller than a distance between the radiation detection elements in the second radiation entrance region.

9. The radiation detector according to claim 1, further comprising:
an analyzing unit which calculates the position of the radiation source in the space to be observed.

10. The radiation detector according to claim 9, wherein the analyzing unit calculates a first plane including the traveling direction of the incoming radiation, and calculates the position of the radiation source in accordance with the calculated first plane, by using the occurrence position of the first interaction, the occurrence position of the second interaction, the direction in which the recoil electron is scattered.

11. The radiation detector according to claim 1, further comprising:
a visible-light sensor configured to form a visible-light image of the space to be observed.

12. The radiation detector according to claim 11, further comprising:
an image composing circuit which composes the calculation result of the position of the radiation source and the visible-light image acquired by the visible-light sensor and which displays the position of the radiation source on the visible-light image.

13. The radiation detector according to claim 1, further comprising:
a distance measurement sensor configured to measure the distance of the position of the radiation source,
wherein the distance of the position of the radiation source is used to convert the intensity of the radiation source to a value indicating the amount of a radioactive substance in the radiation source.

14. A radiation detection module comprising:
at least one radiation detector according to claim 1.

15. A radiation detector comprising:
a plurality of image sensor groups including a plurality of first and second image sensor chips stacked on a support substrate, the first and second image sensor chips in which pixel circuits configured to photoelectrically convert incoming light and store a generated charge are arranged in matrix form; and
an analyzing unit which analyzes an occurrence position of first radiation by using an occurrence position of a first Compton scattering identified by a charge generated by a first recoil electron resulting from the first Compton scattering attributed to the first radiation entering the first image sensor chip, a movement direction of the first recoil electron moving between the pixel circuits in the first image sensor chip, and an occurrence position of a second Compton scattering identified by a charge generated by a second recoil electron resulting from the second Compton scattering, the second Compton scattering being attributed to the entrance of second radiation generated by the first Compton scattering into the second image sensor chip.

16. A radiation detection method comprising:
detecting, in a first radiation entrance region in a first detection unit, an occurrence position of a first interaction resulting from incoming radiation in the first radiation entrance region and a direction in which the recoil electron is scattered by the first interaction in the first radiation entrance region, the occurrence position of the first interaction corresponding to the position where the recoil electron is generated by the first interaction in the first radiation entrance region, the first detection unit including a plurality of photoelectric conversion elements arranged in matrix form in the first radiation entrance region which the external incoming radiation enters;
detecting, in a second radiation entrance region in a second detection unit which scattered radiation resulting from the first interaction enters, an occurrence position of a second interaction resulting from the scattered radiation in the second radiation entrance region; and
calculating the position of a source of the incoming radiation by using the occurrence position of the first interaction, the occurrence position of the second interaction, and the direction in which the recoil electron is scattered.

17. The radiation detection method according to claim 16, further comprising:
forming an image of a space including the radiation source; and
displaying the calculated position of the incoming radiation on the image.

18. The radiation detection method according to claim 16, further comprising:
measuring the distance of the position of the radiation source; and
converting the intensity of the radiation source to a value indicating the amount of a radioactive substance in the radiation source by using the distance of the position of the radiation source.

19. The radiation detection method according to claim 16, wherein
the first and second interactions and the recoil electrons are detected by an image sensor which includes a plurality of pixel circuits arranged in matrix form in the first and second detection units.

20. The radiation detection method according to claim 16, wherein
the first interaction and the recoil electrons are detected by an image sensor which includes a plurality of pixel circuits arranged in matrix form in the first detection unit, and
the second interaction is detected by a radiation detection device in the second detection unit.

* * * * *